United States Patent
Okamura

(10) Patent No.: US 8,605,331 B2
(45) Date of Patent: Dec. 10, 2013

(54) IMAGE PROCESSING SYSTEM, IMAGE PROCESSING APPARATUS AND JUDGMENT APPARATUS

(75) Inventor: Akihiro Okamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 350 days.

(21) Appl. No.: 13/066,747

(22) Filed: Apr. 21, 2011

(65) Prior Publication Data

US 2011/0261374 A1  Oct. 27, 2011

(30) Foreign Application Priority Data

Apr. 21, 2010  (JP) .................................. 2010-098085

(51) Int. Cl.
- *G06F 15/00* (2006.01)
- *G06F 3/12* (2006.01)
- *G06K 15/00* (2006.01)

(52) U.S. Cl.
USPC ........................... 358/1.9; 358/1.14; 358/1.15

(58) Field of Classification Search
USPC ......................................... 358/1.9, 1.14, 1.15
See application file for complete search history.

(56) References Cited

U.S. PATENT DOCUMENTS

| | | | |
|---|---|---|---|
| 8,243,300 B2 * | 8/2012 | Oomura | 358/1.14 |
| 2009/0207439 A1 | 8/2009 | Oomura | |

FOREIGN PATENT DOCUMENTS

| | | | |
|---|---|---|---|
| JP | 11-203074 A | 7/1999 |
| JP | 2006-172094 A | 6/2006 |
| JP | 2007-122366 A | 5/2007 |
| JP | 2009-199253 A | 9/2009 |

* cited by examiner

*Primary Examiner* — Charlotte M Baker
(74) *Attorney, Agent, or Firm* — Edwards Wildman Palmer LLP; David G. Conlin; David A. Tucker

(57) ABSTRACT

A judgment apparatus 2 for judging the possibility of image processing in an image processing apparatus 1 transmits setting item information indicating setting items to be used for judging the possibility of image processing to the image processing apparatus 1. The image processing apparatus 1 transmits setting information indicating settings corresponding to the setting items indicated by the setting item information to the judgment apparatus 2 at the time of image processing, and the judgment apparatus 2 judges the possibility of image processing on the basis of the setting information. The setting information transmitted by the image processing apparatus 1 does not indicate all the settings required for image processing but indicates settings corresponding to the setting items specified by the setting item information, whereby the amount of the data of the setting information is reduced.

6 Claims, 24 Drawing Sheets

F I G. 1
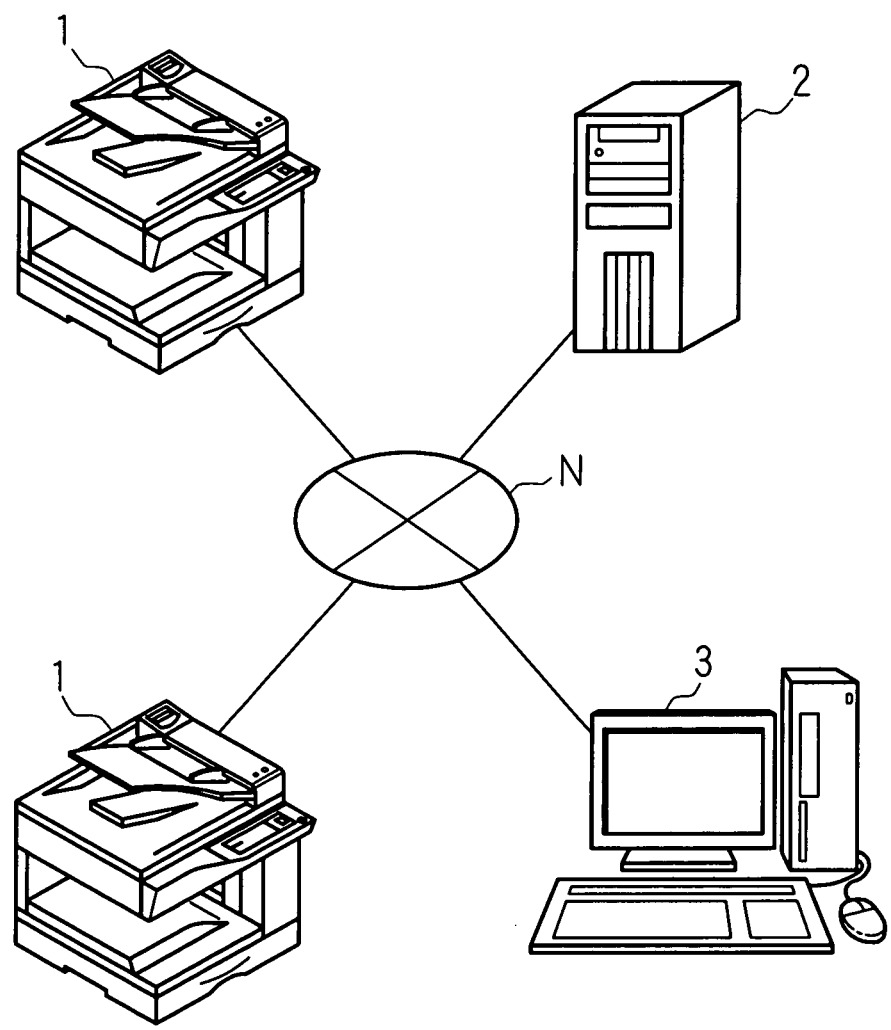

F I G. 5

| SETTING ITEM |
|---|
| BOTH SIDE PRINTING |
| N-Up |

F I G. 7

| ID | LOGICAL OPERATOR | SETTING ITEM | SETTING | COMPARISON CONDITION |
|---|---|---|---|---|
| 1 | — | BOTH SIDE PRINTING | ONE SIDE | EQUAL |
| 2 | — | N-Up | 1-Up | EQUAL |
| 3 | AND | — | — | — |
| 4 | NOT | | | |

F I G. 9

| APPARATUS ID | RULE ID |
|---|---|
| AA | 1 |
| BB | 2 |
| | |

FIG. 10

| ID | RULE ID | SUB ID | LOGICAL OPERATOR | SETTING ITEM | SETTING | COMPARISON CONDITION |
|---|---|---|---|---|---|---|
| 1 | 1 | 1 | — | COLOR SETTING | COLOR | NOT EQUAL |
| 2 | 2 | 1 | — | BOTH SIDE PRINTING | ONE SIDE | EQUAL |
| 3 | 2 | 2 | — | N-Up | 1-Up | EQUAL |
| 4 | 2 | 3 | AND | — | — | — |
| 5 | 2 | 4 | NOT | — | — | — |
| 6 | 3 | 1 | — | COLOR SETTING | MONOCHROME | EQUAL |
| ... | | | | ... | | |

FIG. 12

| SETTING ITEM |
| --- |
| COLOR SETTING |
| BOTH SIDE PRINTING |
| N-Up |

F I G. 1 4

| SETTING ITEM | JUDGMENT RULE |
|---|---|
| COLOR SETTING | NEGLECT |
| N-Up | NOT PERMITTED |

FIG. 17

| LOGIN NAME | PASSWORD | RULE ID |
|---|---|---|
| User1 | Pass1 | 1 |
| User2 | Pass2 | 2 |
| User3 | Pass3 | 1 |

IMAGE PROCESSING SYSTEM, IMAGE PROCESSING APPARATUS AND JUDGMENT APPARATUS

CROSS-REFERENCE TO RELATED APPLICATIONS

This Nonprofessional application claims priority under 35 U.S.C. §119(a) on Patent Application No.2010-098085 filed in Japan on Apr. 21, 2010, the entire contents of which are hereby incorporated by reference.

BACKGROUND

1. Technical Field

The present invention relates to an image processing system, an image processing apparatus and a judgment apparatus, wherein the judgment apparatus judges whether image processing in the image processing apparatus can be executed.

2. Description of Related Art

Some of image processing apparatuses developed in recent years are equipped with many functions, such as color printing, both side printing and page allocation, without being restricted to monochrome printing. Furthermore, an image processing apparatus connected to a communication network is configured so as to be able to receive job data transmitted from a plurality of transmission apparatuses, such as PCs (personal computers), via a communication network and to perform image processing on the basis of the received job data. The image processing apparatus connected to the communication network as described above can be used by unspecific numerous users via the communication network by using the transmission apparatuses, a system for controlling the functions of the image processing apparatus being usable by respective users has been developed.

Japanese Patent Application Laid-open Publication No. 2006-172094 discloses a technology in which while a server apparatus totally controls function restriction for respective users, the server apparatus receives function information indicating a function to be used at the time of image processing and judges whether the use of the function is restricted on the basis of the function information, and in the case that the use of the function is restricted, the server apparatus causes an image processing apparatus to use an alternative function. Furthermore, Japanese Patent Application Laid-open Publication No. 2007-12236 discloses a technology in which a server apparatus transmits information on function usage restriction to respective apparatuses connected to a communication network. Moreover, Japanese Patent Application Laid-open Publication No. 2009-199253 discloses a technology in which an image processing apparatus stores information on function restriction for respective users, and the information on function restriction is transmitted from the image processing apparatus to client apparatuses, whereby functions being usable by the users are controlled.

SUMMARY OF THE INVENTION

In the conventional technologies for restricting functions to be used in the image processing apparatus, it is necessary to transmit and receive information, such as function information required to restrict the functions to be used by the image processing apparatus, other than job data, each time image processing is tried. In an environment in which numerous image processing apparatuses and transmission apparatuses are connected to a communication network, information to be transmitted and received, other than job data, increases the traffic on the communication network, thereby causing a problem that the communication speed of the communication network decreases.

In consideration of these circumstances, the present invention is intended to provide an image processing system, an image processing apparatus and a judgment apparatus, capable of restricting functions to be used by the image processing apparatus while suppressing the decrease in the communication speed of a communication network, by reducing the amount of information to be transmitted and received other than job data.

An image processing system according to the present invention has one or more image processing apparatuses; and a judgment apparatus for judging the possibility of image processing in the image processing apparatus, wherein the judgment apparatus includes a setting item information transmission section for transmitting, to the image processing apparatus, setting item information indicating one or more specific setting items for setting the details of image processing in the image processing apparatus, the image processing apparatus includes an image processing instruction receiving section for receiving an image processing instruction; a setting information generating section for generating setting information indicating settings corresponding to setting items indicated by the received setting item information among the settings related to image processing according to the received image processing instruction; and a judgment request transmission section for transmitting the generated setting information and a judgment request for requesting a judgment for the possibility of image processing according to the image processing instruction to the judgment apparatus, the judgment apparatus further includes a judgment section for judging the possibility of the image processing requested by the received judgment request on the basis of the received setting information; and a judgment result transmission section for transmitting a judgment result at the judgment section to the image processing apparatus, and the image processing apparatus further includes an image processing section for executing the image processing in the case that the received judgment result permits the execution of the image processing.

The image processing system according to the present invention is characterized in that the judgment apparatus further includes a setting item storage section for storing one or more specific setting items so as to be related to apparatus identification information for identifying the image processing apparatus, and that the setting item information transmission section transmits setting item information indicating setting items stored so as to be related to the stored apparatus identification information to the image processing apparatus.

The image processing system according to the present invention is characterized in that the image processing apparatus further includes a list transmission section for transmitting a list of a plurality of setting items capable of being set at the time of image processing to the judgment apparatus, that the judgment apparatus further includes a setting item information generating section for generating setting item information indicating one or more specific setting items contained in the received list, and that the setting item information transmission section transmits the generated setting item information to the image processing apparatus serving as the transmission source of the list.

The image processing system according to the present invention is characterized in that the judgment apparatus further includes a condition storage section for storing conditions to be satisfied by settings related to image processing so that the execution of image processing in the image processing apparatus is permitted while the conditions are related to user identification information for identifying a user, that the image processing apparatus, further includes a user identification information receiving section for receiving user identification information; and a user identification information transmission section for transmitting the received user identification information to the judgment apparatus, and that the judgment section judges the possibility of image processing in the image processing apparatus by judging whether the settings indicated by the received setting information satisfy the conditions stored so as to be related to the user identification information received at the judgment apparatus.

The image processing system according to the present invention is characterized in that the image processing section executes plural types of image processing, that the image processing apparatus can receive an image processing instruction corresponding to each of the plural types of image processing, and that the judgment apparatus stores a condition common in the plural types of image processing as a condition to be satisfied by a setting related to image processing so that the execution of image processing in the image processing apparatus is permitted while the condition is related to the user identification information.

The image processing system according to the present invention is characterized in that the image processing apparatus further includes the designation information transmission section for transmitting, to the judgment apparatus, designation information for designating information to be transmitted to the image processing apparatus by the judgment apparatus together with the judgment result, and that the judgment apparatus transmits the information designated by the designation information to the image processing apparatus when the judgment result at the judgment section is transmitted to the image processing apparatus.

The image processing apparatus according to the present invention has a setting item information receiving section for receiving setting item information indicating one or more specific setting items for setting the details of image processing; an image processing instruction receiving section for receiving an image processing instruction; a setting information generating section for generating setting information indicating settings corresponding to the setting items indicated by the setting item information among the settings related to image processing according to the received image processing instruction; a judgment request transmission section for transmitting the generated setting information and a judgment request for requesting the judgment for the possibility of image processing according to the image processing instruction; a judgment result receiving section for receiving the judgment result regarding the possibility of the image processing; and an image processing section for executing the image processing in the case that the received judgment result permits the execution of the image processing.

The judgment apparatus according to the present invention for judging the possibility of image processing in an external image processing apparatus has a setting item information transmission section for transmitting, to the external image processing apparatus, setting item information indicating one or more specific setting items for setting the details of image processing in the external image processing apparatus, a judgment request receiving section for receiving, from the external image processing apparatus, setting information indicating settings corresponding to setting items indicated by the setting item information among the settings related to image processing in the external image processing apparatus and a judgment request for requesting a judgment for the possibility of the image processing; a judgment section for judging the possibility of the image processing requested by the received judgment request on the basis of the received setting information; and a judgment result transmission section for transmitting the judgment result at the judgment section to the external image processing apparatus.

In the present invention, the judgment apparatus for judging the possibility of image processing in the image processing apparatus transmits beforehand, to the image processing apparatus, the setting item information indicating the setting items to be used by the image processing apparatus at the time of image processing to judge the possibility of image processing among the setting items for setting the details of the image processing. At the time of the image processing, the image processing apparatus transmits, to the judgment apparatus, the setting information indicating the settings corresponding to the setting items indicated by the setting item information, and the judgment apparatus judges the possibility of image processing on the basis of the setting information. Since the setting information transmitted by the image processing apparatus does not indicate all the settings required for the image processing but indicates the settings corresponding to the setting items indicated by the setting item information, the amount of data of the setting information is reduced.

In addition, in the present invention, the judgment apparatus stores conditions for judging the possibility of image processing so as to be related to the apparatus identification information of the image processing apparatus and judges the possibility of image processing in the image processing apparatus on the basis of conditions related to the apparatus identification information. The judgment apparatus applies function restriction that is different for each image processing apparatus to the image processing apparatus.

Furthermore, in the present invention, the image processing apparatus informs setting items that can be set at the time of image processing to the judgment apparatus, and the judgment apparatus transmits the setting item information indicating a specific setting item among the informed setting items to the image processing apparatus. Since information indicating setting items that cannot be set when the image processing apparatus performs image processing is not contained in the setting item information to be transmitted from the judgment apparatus, the image processing apparatus does not transmit information related to the setting items that cannot be set at the time of image processing.

Moreover, in the present invention, the judgment apparatus stores the condition for judging the possibility of image processing for each of a plurality of users and judges the possibility of image processing in each image processing apparatus on the basis of the condition of each user. The judgment apparatus restricts the number of functions to be used by the image processing apparatus for each user when each user uses the image processing apparatus.

Besides, in the present invention, the image processing apparatus can execute plural types of image processing, such as printing and copying based on job data. The judgment apparatus stores a condition common in the plural types of image processing for each user as a condition under which the possibility of image processing is judged, and judges the possibility of image processing on the basis of the same condition for the same user.

Still further, in the present invention, when transmitting the result of the judgment for the possibility of image processing to the image processing apparatus, the judgment apparatus transmits pre-designated information to the image processing apparatus, and the image processing apparatus executes information processing using the transmitted information.

The information to be transmitted from the judgment apparatus is designated beforehand by transmitting the designation information from the image processing apparatus to the judgment apparatus.

With the present invention, since the amount of data of the setting information to be transmitted to the judgment apparatus is reduced each time the image processing apparatus tries to execute image processing, the increase in the traffic on the communication network is suppressed, and the decrease in the communication speed of the communication network is suppressed. Hence, the present invention produces excellent effects, for example, in which even in an environment wherein the plurality of image processing apparatuses and the transmission apparatus are connected to the communication network, the number of functions to be used when the image processing apparatus performs image processing can be restricted while the decrease in the communication speed of the communication network is suppressed.

The above and further objects and features of the invention will more fully be apparent from the following detailed description with accompanying drawings.

BRIEF DESCRIPTION OF THE SEVERAL VIEWS OF THE DRAWINGS

FIG. 1 is a conceptual view showing an overall configuration of an image processing system according to Embodiment 1 of the present invention;

FIG. 5 is a conceptual view showing a content example of a setting item table;

FIG. 7 is a conceptual view showing a content example of a condition table according to Embodiment 1;

FIG. 9 is a conceptual view showing a content example of an apparatus-specific condition control table;

FIG. 10 is a conceptual view showing a content example of a condition table according to Embodiment 2;

FIG. 12 is a conceptual view showing a content example of a setting item list;

FIG. 14 is a conceptual view showing a content example of non-containing time judgment rules;

FIG. 17 is a conceptual view showing a content example of a user control table;

DETAILED DESCRIPTION

The present invention will be described below specifically on the basis of the accompanying drawings showing embodiments thereof.

(Embodiment 1)

FIG. 1 is a conceptual view showing an overall configuration of an image processing system according to Embodiment 1 of the present invention. A plurality of image processing apparatuses 1 are connected to a communication network N. Furthermore, a judgment apparatus 2 for judging the possibility of image processing in the image processing apparatuses 1 and a transmission apparatus 3 for transmitting job data instructing image processing to the image processing apparatuses 1 are connected to the communication network N. Although two image processing apparatuses 1 are shown in FIG. 1, the image processing system may be configured so as to be equipped with one image processing apparatus 1 or may be configured so as to be equipped with three or more image processing apparatuses 1.

Figure 2:
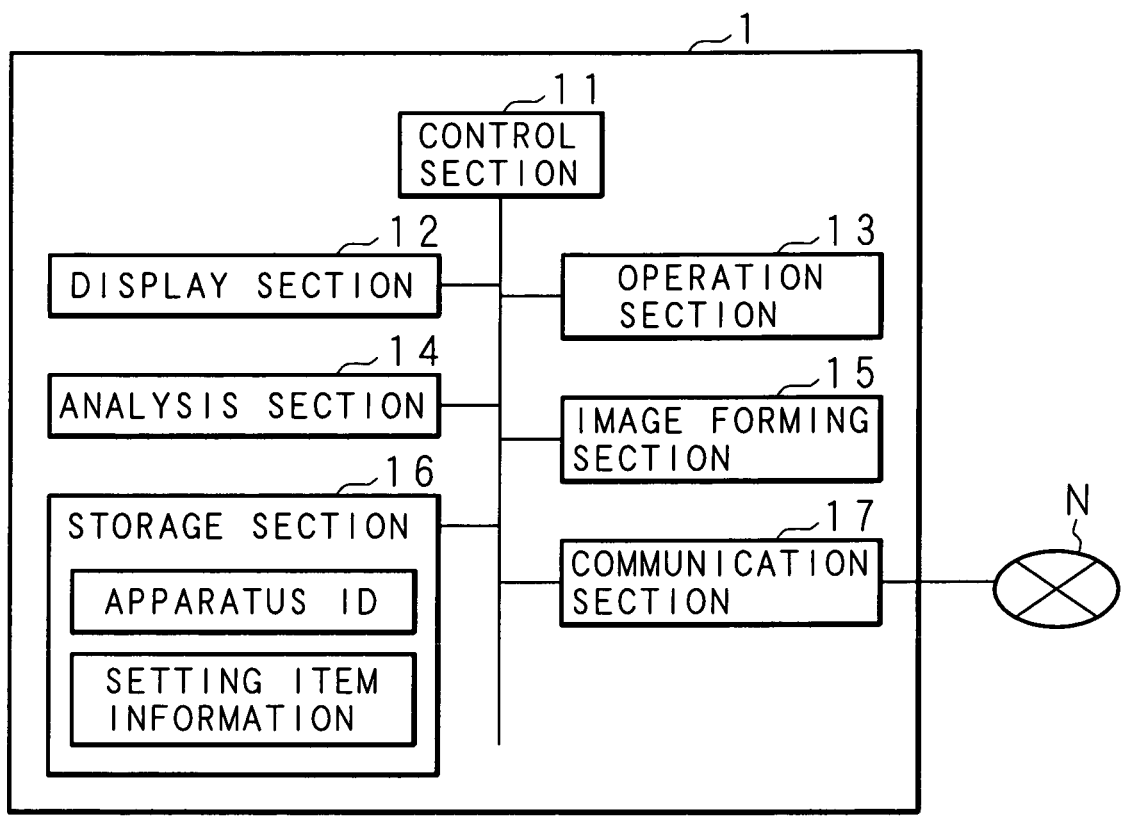
FIG. 2 is a block diagram showing an internal functional configuration of the image processing apparatus according to Embodiment 1 of the present invention.

FIG. 2 is a block diagram showing an internal functional configuration of the image processing apparatus 1 according to Embodiment 1 of the present invention. The image processing apparatus 1 is equipped with a control section 11 for controlling the operations of the respective sections of the image processing apparatus 1; a display section 12 for displaying information required for the operation of the image processing apparatus 1; and an operation section 13 to be operated by the user. Furthermore, the image processing apparatus 1 is equipped with an analysis section 14 for analyzing job data; an image forming section 15 for executing image formation; a storage section 16 for storing information; and a communication section 17 for performing communication via the communication network N.

The control section 11 is formed of a calculation section, a ROM for storing a control program required for the operation of the image processing apparatus 1, a RAM for storing temporary data associated with calculation, etc. The display section 12 is a display formed of a liquid crystal panel, an EL (electroluminescence) panel or the like. The operation section 13 is formed of a numeric keypad, a touch panel, or the like. The display section 12 and the operation section 13 may be integrated partly or wholly. The communication section 17 is connected to the communication network N outside the image processing apparatus 1 and transmits and receives information to and from the judgment apparatus 2 and the transmission apparatus 3 via the communication network N. Job data transmitted from the transmission apparatus 3 via the communication network N is received at the communication section 17, whereby the image processing apparatus 1 receives an image processing instruction.

The job data received by the communication section 17 contains image data and settings relating to image processing, such as image color, page allocation, etc. The analysis section 14 analyzes the job data received by the communication section 17 and performs processing for generating the settings and image data related to image processing from the job data. The image forming section 15 is formed of various image processing engines for executing image forming processing for forming images based on the image data on recording paper. The control section 11 causes the analysis section 14 to generate the settings and image data related to image processing from the job data received by the communication section 17 and causes the image forming section 15 to form images based on the generated settings and image data. The storage section 16 is formed of a semiconductor memory, a hard disk, etc. The storage section 16 stores an apparatus ID for identifying the image processing apparatus 1, inherent to the image processing apparatus 1. In addition, the storage section 16 can store setting item information indicating specific setting items among a plurality of setting items for setting the details of image processing.

Figure 3:
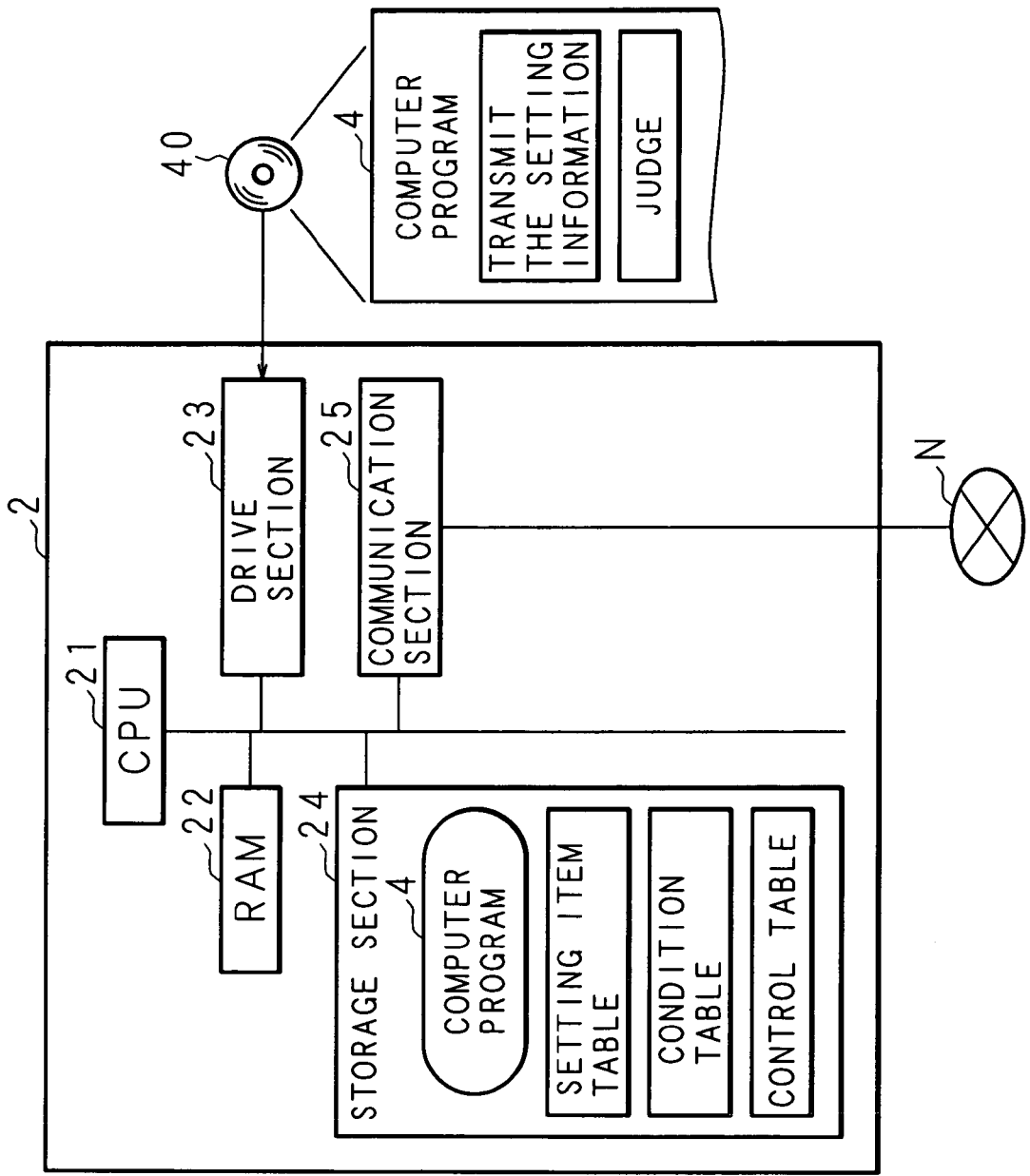
FIG. 3 is a block diagram showing an internal configuration of a judgment apparatus according to Embodiment 1 of the present invention.

FIG. 3 is a block diagram showing an internal configuration of the judgment apparatus 2 according to Embodiment 1 of the present invention. The judgment apparatus 2 is formed of a general-purpose computer. The judgment apparatus 2 is equipped with a CPU (central processing unit) 21 for performing calculation; a RAM 22 for storing temporary information generated during calculation; a drive section 23, such as a CD-ROM drive, for reading information from a recording medium 40, such as an optical disc; a storage section 24, such as a hard disk; and a communication section 25 for performing communication via the communication network N. The CPU 21 causes the drive section 23 to read a computer program 4 recorded on the recording medium 40 from the recording medium 40 and causes the storage section 24 to store the computer program 4 read by the drive section 23. The computer program 4 is loaded from the storage section 24 to the RAM 22 as necessary, and the CPU 21 executes processing required for the judgment apparatus 2 on the basis of the loaded computer program 4. The computer program 4 may be configured so as to be downloaded from another server apparatus, not shown, connected to the communication network N to the judgment apparatus 2 and stored in the storage section 24.

The storage section 24 stores a setting item table for recording setting items to be used for judging the possibility of image processing among the plurality of setting items for setting the details of image processing. In addition, the storage section 24 stores a condition table for recording conditions to be satisfied by the settings related to image processing so that the execution of image processing is permitted. Furthermore, the storage section 24 stores a control table for recording the apparatus ID of the image processing apparatus 1, wherein the execution of image processing is controlled by judging the possibility of image processing.

The transmission apparatus 3 is formed of a general-purpose computer, such as a PC (personal computer). In the case that the transmission apparatus 3 is operated by the user and accepts a predetermined operation, the transmission apparatus 3 transmits job data containing image data to the image processing apparatus 1 via the communication network N.

Next, the operation of the image processing system according to this embodiment will be described below. The image processing system performs setting item specifying processing for specifying setting items to be used so that the judgment apparatus 2 judges the possibility of image processing in the image processing apparatus 1 and performs judgment processing for judging the possibility of image processing when the image processing apparatus 1 receives the job data.

Figure 4:
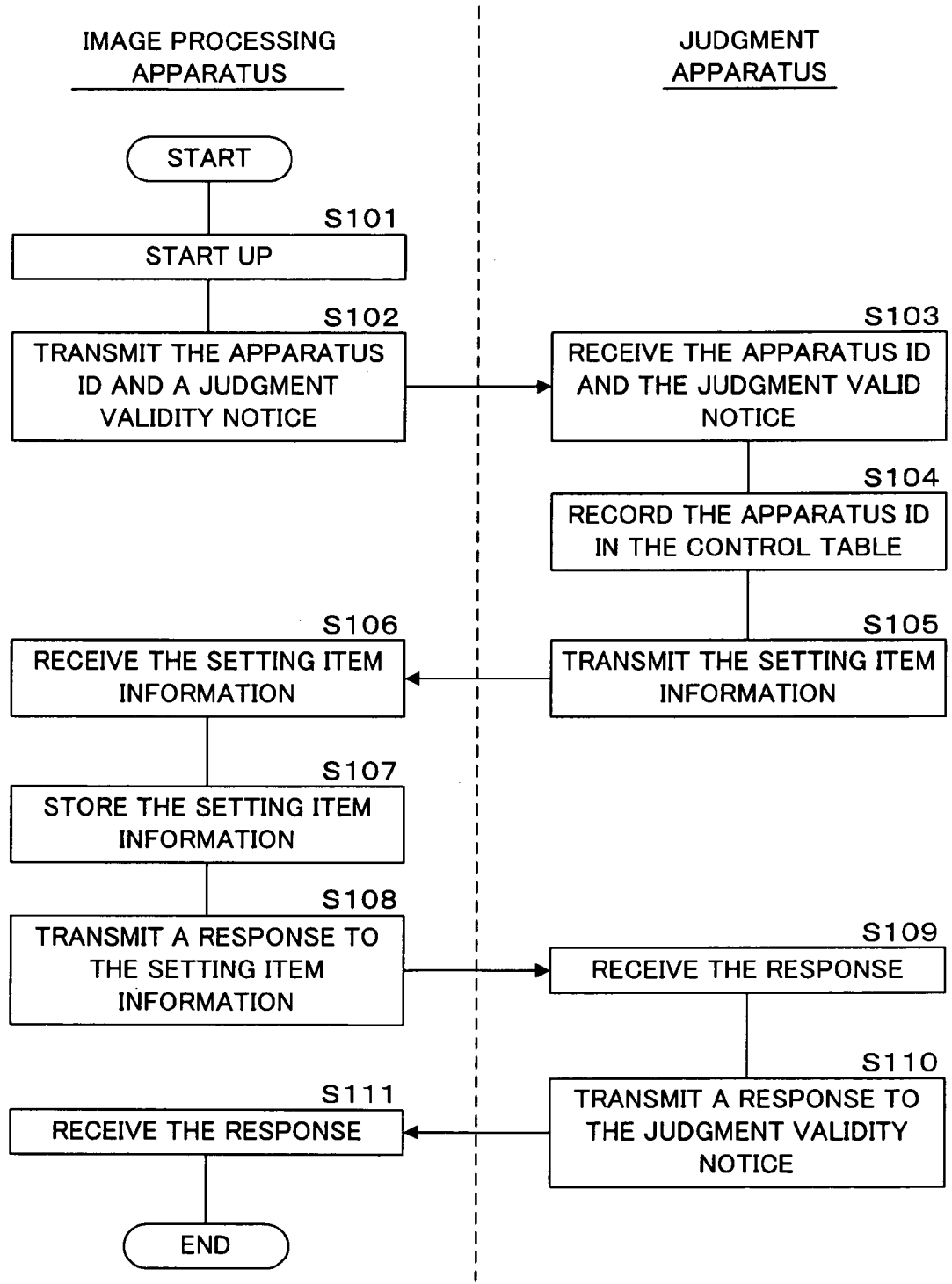
FIG. 4 is a flowchart showing the procedure of setting item specifying processing to be executed by the image processing system according to Embodiment 1.

FIG. 4 is a flowchart showing the procedure of the setting item specifying processing to be executed by the image processing system according to Embodiment 1. The CPU 21 of the judgment apparatus 2 executes the following processing according to the computer program 4 loaded into the RAM 22. The image processing apparatus 1 starts when power is turned on (at S101). The control section 11 causes the communication section 17 to transmit, to the judgment apparatus 2 via the communication network N, the apparatus ID stored in the storage section 16 and a judgment validity notice indicating that the image processing apparatus 1 has become a state in which the judgment for the possibility of image processing is valid (at S102). The image processing apparatus 1 may be configured so that switching is performed between a state in which the judgment for the possibility of image processing is valid and a state in which the judgment is invalid. In this configuration, the image processing apparatus 1 executes the processing of step S102 in the case that an instruction for making the judgment valid is received through the predetermined operation performed on the operation section 13 by the user.

The judgment apparatus 2 receives, at the communication section 25, the apparatus ID and the judgment validity notice transmitted from the image processing apparatus 1 via the communication network N (at S103), and the CPU 21 records the received apparatus ID in the control table stored in the storage section 24 (at S104). Next, the CPU 21 causes the communication section 25 to transmit, to the image processing apparatus 1 via the communication network N, the setting item information for indicating the setting items recorded in the setting item table stored in the storage section 24 as the setting items to be used for judging the possibility of image processing (at S105).

Figure 5:
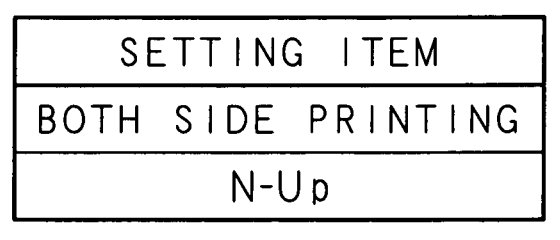

FIG. 5 is a conceptual view showing a content example of the setting item table. A setting item "both side printing" for setting whether recording is performed on one side or both sides when image recording is performed on recording paper and a setting item "N-Up" for setting whether how many images are allocated on one page of recording paper are recorded as setting items.

The image processing apparatus 1 receives, at the communication section 17, the setting item information transmitted from the judgment apparatus 2 via the communication network N (at S106), and the control section 11 causes the storage section 16 to store the received setting item information (at S107). Next, the control section 11 causes the communication section 17 to transmit, to the judgment apparatus 2, a response to the setting item information indicating that the setting item information has been received (at S108). The judgment apparatus 2 receives the response to the setting item information at the communication section 25 (at S109), and the CPU 21 causes the communication section 25 to transmit, to the image processing apparatus 1, a response to the judgment validity notice indicating that the judgment apparatus 2 has become the state in which the judgment for the possibility of image processing in the image processing apparatus 1 can be executed (at S110). The image processing apparatus 1 receives the response to the judgment validity notice at the communication section 17 (at S111), and the procedure of the setting item specifying processing is completed.

Figure 6:
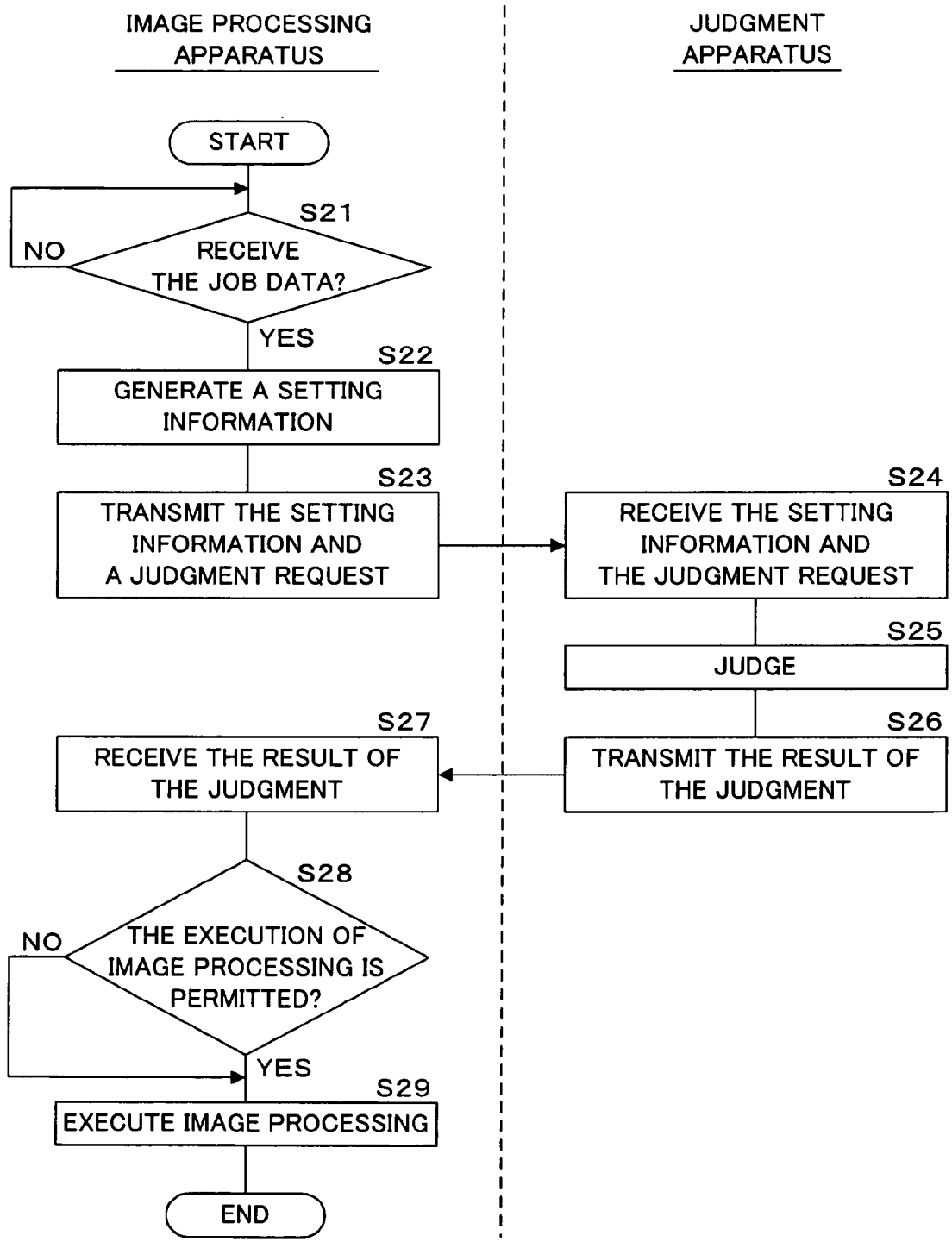
FIG. 6 is a flowchart showing the procedure of judgment processing to be executed by the image processing system according to Embodiment 1.

FIG. 6 is a flowchart showing the procedure of the judgment processing to be executed by the image processing system according to Embodiment 1. The CPU 21 of the judgment apparatus 2 executes the following processing according to the computer program 4 loaded into the RAM 22. The control section 11 of the image processing apparatus 1 waits for the reception of the job data transmitted as necessary from the transmission apparatus 3 at the communication section 17 (at S21). The communication section 17 receives the job data transmitted from the transmission apparatus 3, whereby the image processing apparatus 1 receives an image processing instruction. At step S21 in the case that the job data is not received (NO at S21), the control section 11 keeps waiting for the reception of the job data. In the case that the job data is received at the communication section 17 (YES at S21), the control section 11 causes the analysis section 14 to analyze the received job data, thereby generating setting information indicating the settings corresponding to the setting items indicated by the setting item information (at S22). More specifically, the analysis section 14 extracts image processing settings from the job data and further extracts the settings corresponding to the setting items indicated by the setting item information stored in the storage section 16 from the extracted settings, whereby setting information indicating the extracted settings are generated. Next, the control section 11 causes the communication section 17 to transmit, to the judgment apparatus 2, the generated setting information and a judgment request for requesting a judgment for the possibility of image processing.

The judgment apparatus 2 receives the setting information and the judgment request at the communication section 25 (at S24). The CPU 21 judges whether the settings indicated by the received setting information satisfy the conditions to be stored in the condition table stored in the storage section 24, thereby judging the possibility of image processing in the image processing apparatus 1 (at S25).

FIG. 7 is a conceptual view showing a content example of the condition table according to Embodiment 1. Settings corresponding to specific setting items and comparison conditions are recorded in the condition table so that the settings are compared with the settings indicated by the setting information. Furthermore, in the case that a plurality of setting items are contained, logical operators indicating how the comparison results of the settings corresponding to respective setting items are logically operated are recorded. Serial IDs are assigned to the respective setting items and logical operators. The condition table is configured so that judgments are made assuming that the items are described using the reverse Polish notation in the increasing order of the IDs.

In the processing at step S25 using the example shown in FIG. 7, the CPU 21 obtains a condition corresponding to ID1 and judges whether a comparison condition indicating that the setting corresponding to the setting item "both side printing" indicated by the setting information is "equal" to the setting "one side" recorded in the condition table is true or false. The CPU 21 stores the result of the judgment, true or false, once in the RAM 22. Next, the CPU 21 obtains a condition corresponding to ID2 and judges whether a comparison condition indicating that the setting corresponding to the setting item "N-Up" indicated by the setting information is "equal" to the setting "1-Up" recorded in the condition table is true or false, and stores the result of the judgment in the RAM 22. Then, the CPU 21 obtains a condition corresponding to ID3 and performs AND (logical AND operation) on the results obtained immediately before, in other words, performs the AND operation on the judgment result for the condition corresponding to ID1 and the judgment result for the condition corresponding to ID2. Next, the CPU 21 obtains a condition corresponding to ID4 and performs NOT (logical NOT operation) on the result obtained immediately before, in other words, performs the NOT operation on the operation result for the condition corresponding to ID3. In the case that the final result is true, the CPU 21 judges that the execution of image processing in the image processing apparatus 1 is permitted, and in the case that the final result is false, the CPU 21 judges that the execution of image processing in the image processing apparatus 1 is not permitted. In the example shown in FIG. 7, the execution of image processing is not permitted in the case that the settings indicated by the setting information are "one side" and "1-Up" and the execution of image processing is permitted in the other cases.

Then, the CPU 21 causes the communication section 25 to transmit the result of the judgment at step S25 to the image processing apparatus 1 (at S26). The image processing apparatus 1 receives the result of the judgment at the communication section 17 (at S27), and the control section 11 judges whether the execution of image processing is permitted by the received result of the judgment (at S28). In the case that the execution of image processing is permitted by the result of the judgment (YES at S28), the control section 11 executes image processing corresponding to the received job data (at step S29). More specifically, the control section 11 causes the analysis section 14 to generate settings and image data from the job data and causes the image forming section 15 to record an image based on the image data on recording paper in a configuration conforming to the settings. After the execution of the image processing, the image processing apparatus 1 completes the procedure of the judgment processing. In the case that the execution of the image processing is not permitted by the result of the judgment at step S28 (NO at step S28), the control section 11 completes the procedure of the judgment processing without executing the image processing corresponding to the job data. After completing the procedure of the judgment processing, the control section 11 starts the procedure of the judgment processing from step S21.

As described above, in this embodiment, the judgment apparatus 2 transmits, to the image processing apparatus 1, the setting item information indicating the setting items to be used to judge the possibility of image processing. At the time of image processing, the image processing apparatus 1 transmits, to the judgment apparatus 2, the setting information indicating the settings corresponding to the setting items indicated by the setting item information, and the judgment apparatus 2 judges the possibility of image processing on the basis of the setting information. Since the setting information transmitted by the image processing apparatus 1 does not indicate all the settings required for the image processing but indicates only the settings corresponding to the setting items indicated by the setting item information, the amount of data of the setting information is reduced. Since the amount of data of the setting information to be transmitted is reduced each time the image processing apparatus 1 tries to execute image processing, the increase in the traffic on the communication network N is suppressed, and the decrease in the communication speed of the communication network N is suppressed. Hence, in the present invention, even in an environment in which the plurality of image processing apparatuses 1 and the transmission apparatus 3 are connected to the communication network N, the number of functions to be used when the image processing apparatus 1 performs image processing can be restricted while the decrease in the communication speed of the communication network N is suppressed.

(Embodiment 2)

Figure 8:
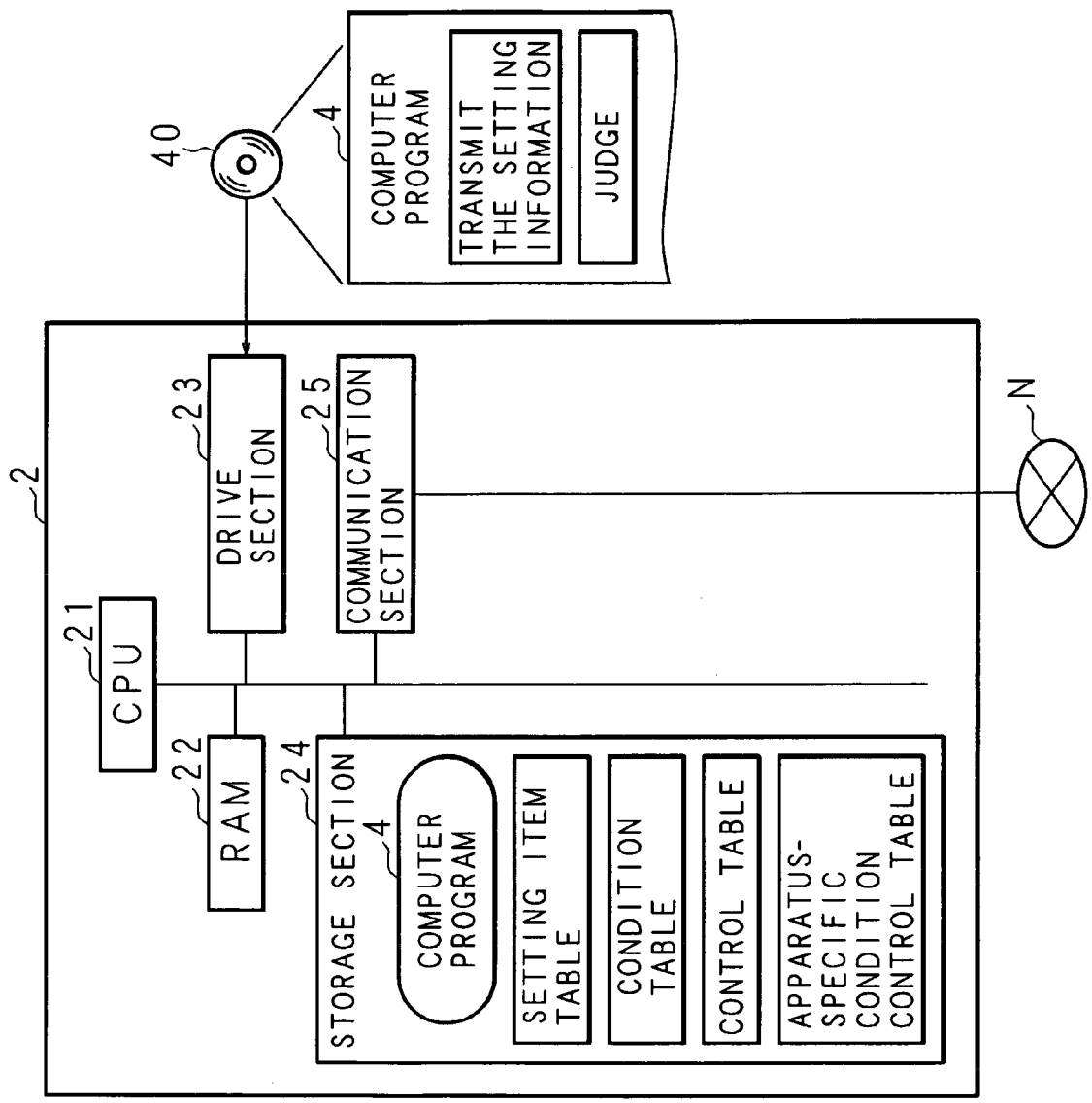
FIG. 8 is a block diagram showing an internal configuration of a judgment apparatus according to Embodiment 2 of the present invention.

In Embodiment 2, a configuration is described in which the judgment apparatus 2 judges the possibility of image processing for the plurality of image processing apparatuses 1 on the basis of individual conditions. The overall configuration of the image processing system and the internal configuration of the image processing apparatus 1 are similar to those according to Embodiment 1, and their descriptions are omitted. FIG. 8 is a block diagram showing an internal configuration of the judgment apparatus 2 according to Embodiment 2 of the present invention. The storage section 24 stores an apparatus-specific condition control table indicating the relationship between each of the plurality of image processing apparatuses 1 and a condition for judging the possibility of image processing. Since the other configurations and operations inside the judgment apparatus 2 are similar to those according to Embodiment 1, the corresponding portions are designated by the same numerals, and their descriptions are omitted.

Figure 9:
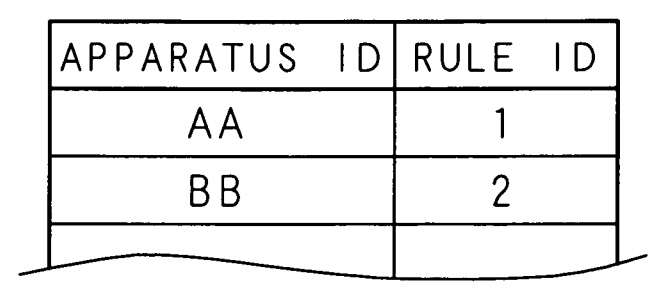

FIG. 9 is a conceptual view showing a content example of the apparatus-specific condition control table. A rule ID for identifying a condition for judging the possibility of image processing is recorded so as to be related to the apparatus ID for identifying each image processing apparatus 1. FIG. 10 is a conceptual view showing a content example of a condition table according to Embodiment 2. In the condition table, a plurality of rule IDs are recorded, and conditions for judging the possibility of image processing are recorded so as to be related to each rule ID. In the case that a plurality of conditions are related to one rule ID, sub IDs are assigned serially to the respective conditions. The condition table is configured so that judgments are made assuming that conditions related to the respective rule IDs are described using the reverse Polish notation in the increasing order of the sub IDs. Although an example in which an apparatus ID is used as apparatus identification information is shown in this embodiment, the judgment apparatus 2 may be configured so as to use other information as apparatus identification information. For example, the judgment apparatus 2 may be configured so that the respective serial IDs are related to the apparatus IDs and so that the IDs related to the apparatus IDs are used as apparatus identification information.

Also in Embodiment 2, the image processing system executes procedures similar to those according to Embodiment 1 shown in the flowcharts of FIGS. 4 and 6. However, the image processing apparatus 1 transmits a judgment request containing an apparatus ID at step S23. In addition, the CPU 21 of the judgment apparatus 2 makes a judgment at step S25 by extracting a rule ID related to an apparatus ID and contained in the received judgment request from the apparatus-specific condition control table, by extracting conditions related to the extracted rule ID from the condition table and by comparing the settings indicated by the extracted condition with the extracted conditions in the order of the sub IDs. The judgment apparatus 2 may have a configuration in which the setting item table is stored for each image processing apparatuses 1 in the storage section 24 and the setting item information specifying setting items for each image processing apparatus 1 is transmitted at step S105.

As described above, in this embodiment, the judgment apparatus 2 stores conditions for judging the possibility of image processing for each of the plurality of image processing apparatuses 1 and judges the possibility of image processing in each image processing apparatuses 1 on the basis of individual conditions. Hence, the judgment apparatus 2 can apply function restriction that is different for each image processing apparatus 1.

(Embodiment 3)

Figure 11:
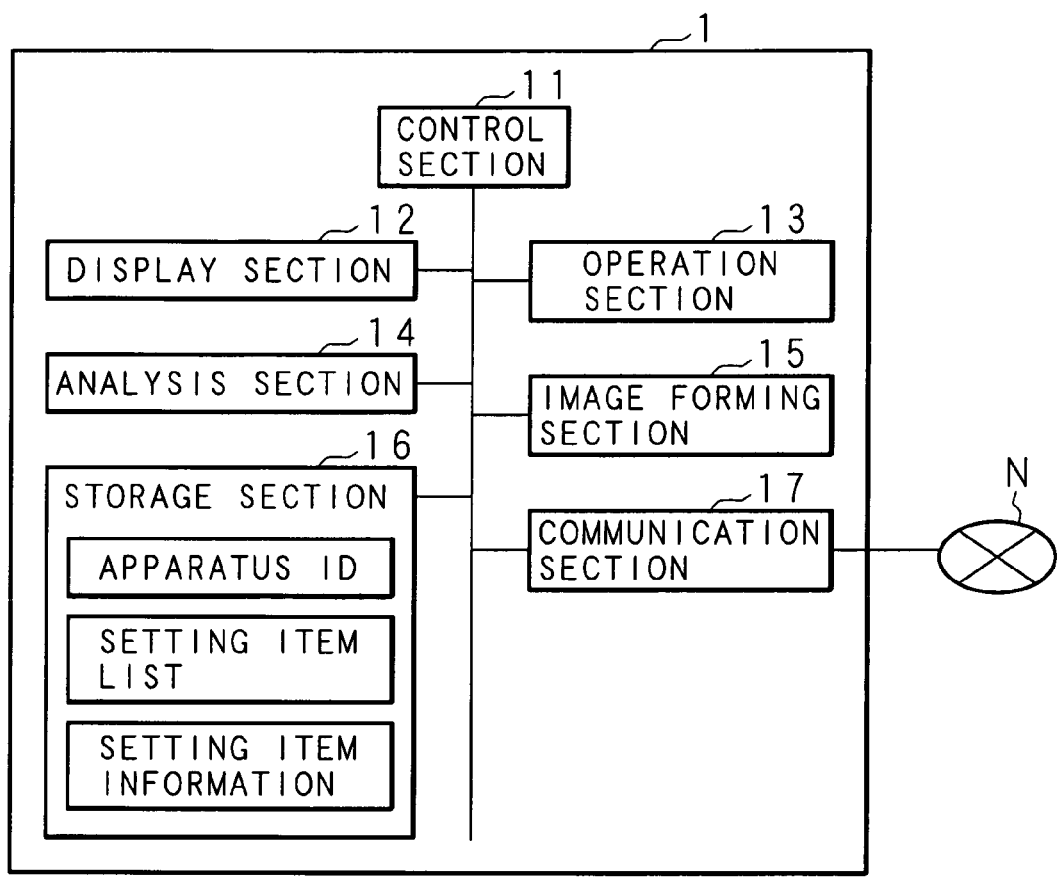
FIG. 11 is a block diagram showing an internal configuration of an image processing apparatus according to Embodiment 3 of the present invention.

Embodiment 3 illustrates a configuration in which the image processing apparatus 1 informs setting items that can be set at the time of image processing. The overall configuration of the image processing system is similar to that according to Embodiment 1, and its description is omitted. FIG. 11 is a block diagram showing an internal configuration of the image processing apparatus 1 according to Embodiment 3 of the present invention. The storage section 16 stores a setting item list for recording a plurality of setting items that can be set when the image processing apparatus 1 performs image processing. FIG. 12 is a conceptual view showing a content example of the setting item list. A plurality of setting items, such as "color setting," "both side printing" and "N-Up," that can be set when the image processing apparatus 1 performs image processing, are recorded in the setting item list. The respective setting items recorded in the setting item list represent functions that can be executed by the image processing apparatus 1. Since the other configurations and operations inside the image processing apparatus 1 are similar to those according to Embodiment 1, the corresponding portions are designated by the same numerals, and their descriptions are omitted.

Figure 13:
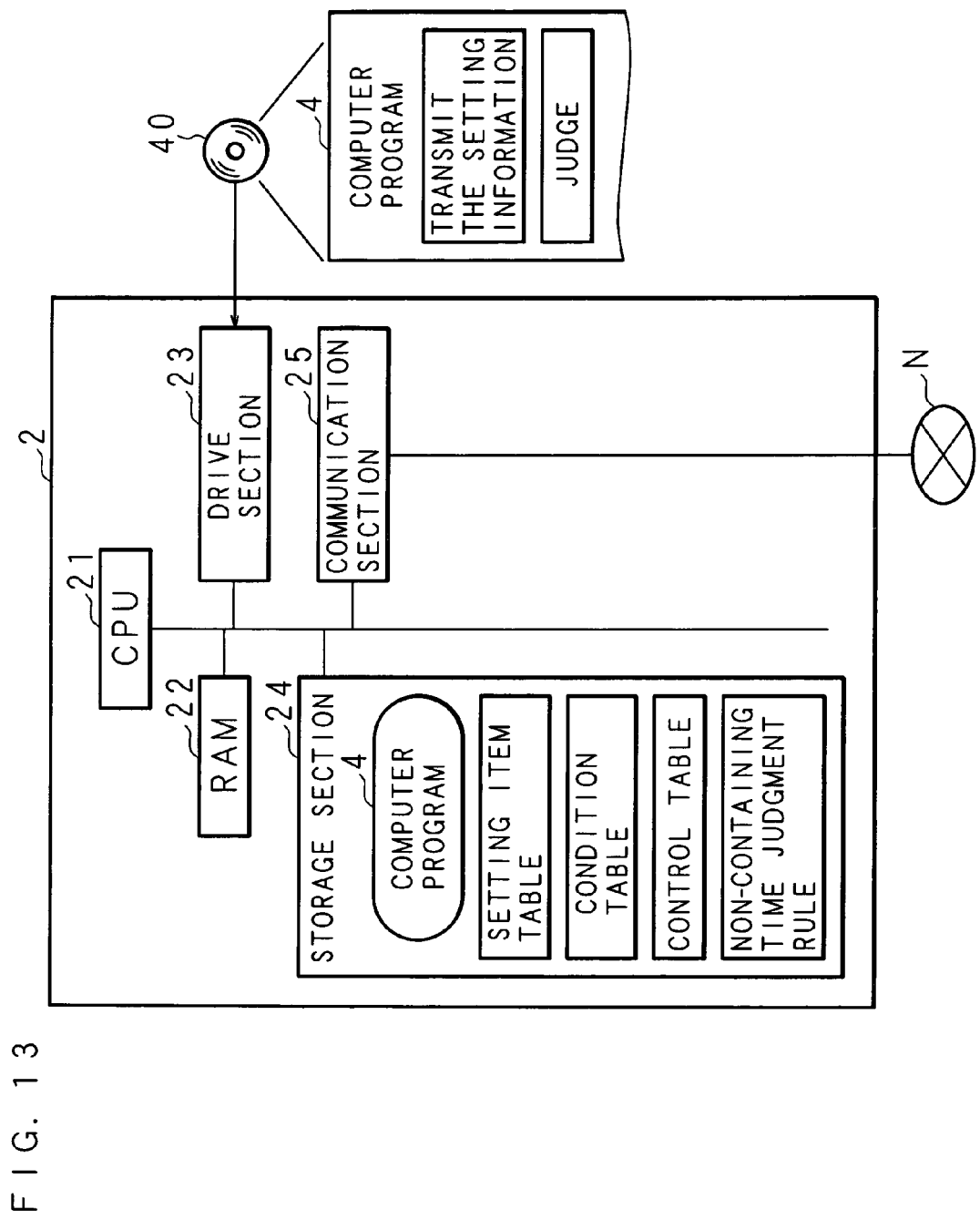
FIG. 13 is a block diagram showing an internal configuration of a judgment apparatus according to Embodiment 3 of the present invention.

FIG. 13 is a block diagram showing an internal configuration of the judgment apparatus 2 according to Embodiment 3 of the present invention. The storage section 24 stores non-containing time judgment rules in which rules for judgments to be made by the image processing apparatus 1 In the case that the settings corresponding to the setting items required to judge the possibility of image processing are not contained in the settings indicated by the setting information received from the image processing apparatus 1 are determined. Since the other configurations and operations inside the judgment apparatus 2 are similar to those according to Embodiment 1, the corresponding portions are designated by the same numerals, and their descriptions are omitted.

FIG. 14 is a conceptual view showing a content example of the non-containing time judgment rules. With respect to each setting item recorded in the setting item table, indicated by the setting information, the rules for the judgment to be made by the CPU 21 in the case that a regular judgment cannot be made because a setting corresponding to the setting item does not exist in the settings are recorded in the non-containing time judgment rules. In the example shown in FIG. 14, a judgment rule "neglect" is recorded so as to be related to the setting item "color setting." This means that in the case that a setting corresponding to "color setting" does not exist in the settings indicated by the setting information, the CPU 21 neglects the condition related to "color setting" in the judgment for the possibility of image processing. Furthermore, in the example shown in FIG. 14, a judgment rule "not permitted" is recorded so as to be related to the setting item "N-Up." This means that in the case that a setting corresponding to "N-Up" does not exist in the settings indicated by the setting information, the CPU 21 does not permit image processing in the judgment for the possibility of image processing.

Figure 15:
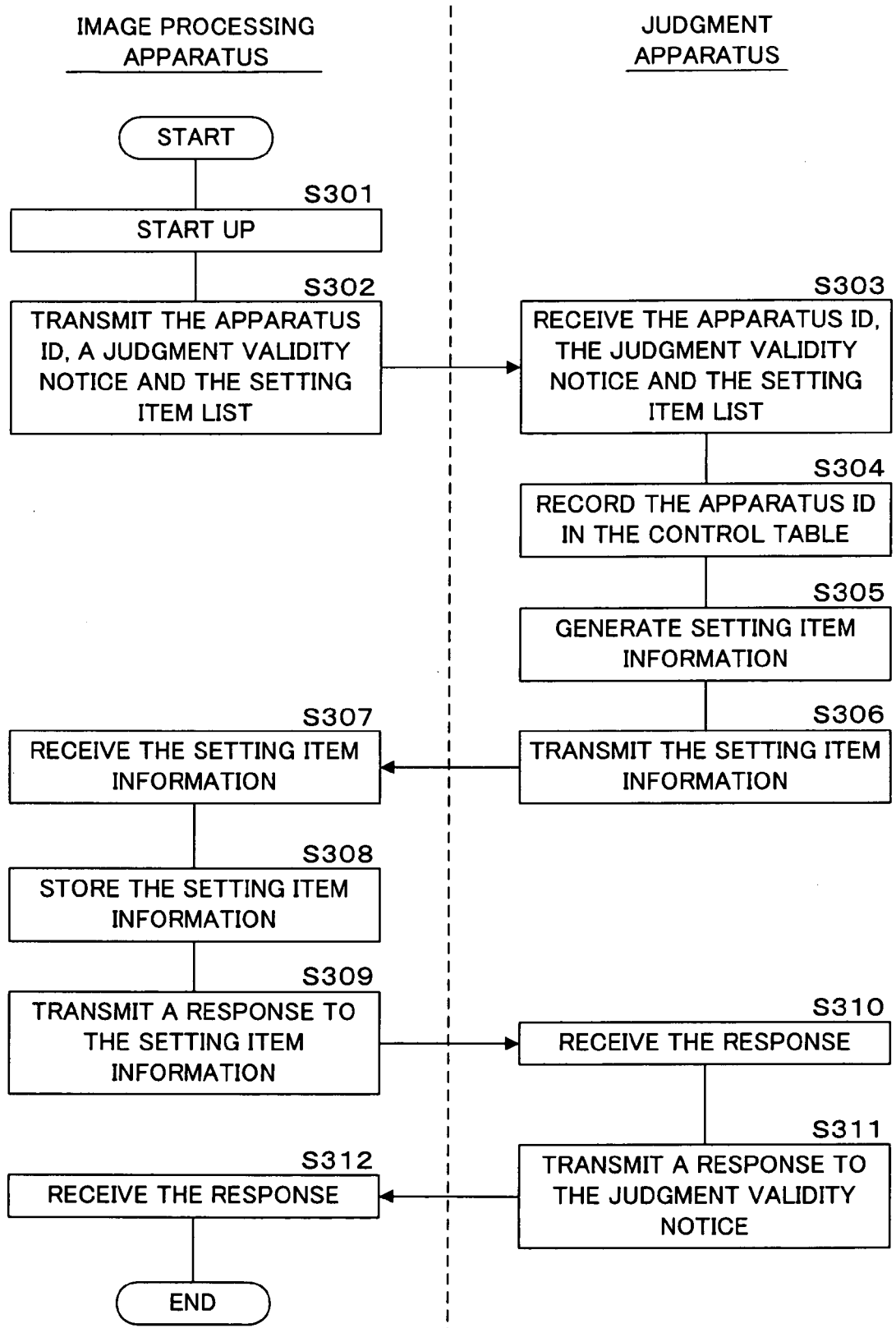
FIG. 15 is a flowchart showing the procedure of setting item specifying processing to be executed by an image processing system according to Embodiment 3.

FIG. 15 is a flowchart showing the procedure of the setting item specifying processing to be executed by the image processing system according to Embodiment 3. The CPU 21 of the judgment apparatus 2 executes the following processing according to the computer program 4 loaded into the RAM 22. The image processing apparatus 1 starts when power is turned on (at S301). The control section 11 causes the communication section 17 to transmit, to the judgment apparatus 2, the apparatus ID and the setting item list stored in the storage section 16 and a judgment validity notice (at S302). The image processing apparatus 1 may be configured so as to execute the processing of step S302 in the case that an instruction for making the judgment valid is received.

The judgment apparatus 2 receives the apparatus ID, the judgment validity notice and the setting item list transmitted from the image processing apparatus 1 at the communication section 25 (at S303), and the CPU 21 records the received apparatus ID in the control table stored in the storage section 24 (at S304). Next, the CPU 21 compares the received setting item list with the setting item table stored in the storage section 24 and generates setting item information indicating the setting items recorded in both the setting item list and the setting item table (at S305). Then, the CPU 21 causes the communication section 25 to transmit the generated setting item information to the image processing apparatus 1 (at S306).

The image processing apparatus 1 receives, at the communication section 17, the setting item information transmitted from the judgment apparatus 2 (at S307). The control section 11 causes the storage section 16 to store the received setting item information (at S308) and causes the communication section 17 to transmit a response to the setting item information to the judgment apparatus 2 (at S309). The judgment apparatus 2 receives the response to the setting item information at the communication section 25 (at S310), and the CPU 21 causes the communication section 25 to transmit, to the image processing apparatus 1, a response to the judgment validity notice (at S311). The image processing apparatus 1 receives the response to the judgment validity notice at the communication section 17 (at S312), and the procedure of the setting item specifying processing is completed.

Also in Embodiment 3, when the image processing apparatus 1 performs image processing, the image processing system executes a judgment similar to that according to Embodiment 1 shown in the flowchart of FIG. 6. However, at step S25, the CPU 21 of the judgment apparatus 2 first judges whether all the settings corresponding to the setting items for judging the possibility of image processing, stored in the condition table, are contained in the received setting item information. In the case that all the settings corresponding to the setting items for judging the possibility of image processing are contained in the received setting item information, the CPU 21 performs the same judgment as that according to Embodiment 1. In the case that a setting item, the setting of which is not contained in the setting information, is present in the setting item for judging the possibility of image processing, the CPU 21 makes a judgment according to a non-containing time judgment rule stored in the storage section 24 and related to the setting item.

For example, in the case that the image processing apparatus 1 is not equipped with a color printing function, the setting item "color setting" is not contained in the setting item list, and the setting item "color setting" is not contained in the setting item information either. Even in the case that color printing is prohibited according to the condition table stored in the storage section 24 of the judgment apparatus 2, the setting corresponding to the setting item "color setting" is not contained in the setting information to be transmitted to the judgment apparatus 2 from the image processing apparatus 1. The CPU 21 of the judgment apparatus 2, the storage section 24 of which stores the non-containing time judgment rules shown in FIG. 14, makes a judgment according to a judgment rule contained in the non-containing time judgment rules and related to the setting item "color setting." Since the judgment rule "neglect" is related to the setting item "color setting" in the example shown in FIG. 14, the CPU 21 judges the possibility of image processing while neglecting the condition related to "color setting."

Moreover, for example, in the case that the image processing apparatus 1 is not equipped with a page allocation function, the setting item "N-Up" is not contained in the setting item list, and the setting item "N-Up" is not contained in the setting item information either. As a result, the image processing apparatus 1 not equipped with the page allocation function executes 1-Up image processing. Even in the case that 1-Up is prohibited according to the condition table stored in the storage section 24 of the judgment apparatus 2, the setting corresponding to the setting item "N-Up" is not contained in the setting information to be transmitted to the judgment apparatus 2 from the image processing apparatus 1. The CPU 21 of the judgment apparatus 2, the storage section 24 of which stores the non-containing time judgment rules shown in FIG. 14, makes a judgment according to a judgment rule contained in the non-containing time judgment rules and related to the setting item "N-Up." Since the judgment rule "not permitted" is related to the setting item "N-Up" in the example shown in FIG. 14, the CPU 21 judges that the execution of image processing is not performed.

As described above, in this embodiment, the image processing apparatus 1 informs setting items that can be set at the time of image processing to the judgment apparatus 2, and the judgment apparatus 2 transmits the setting item information indicating a specific setting item among the informed setting items to the image processing apparatus 1. Since information indicating setting items that cannot be set when the image processing apparatus 1 performs image processing is not contained in the setting item information to be transmitted from the judgment apparatus 2, the image processing apparatus 1 does not transmit information related to the setting items that cannot be set at the time of image processing. Hence, data to be transmitted and received in the image processing system is not wasted, and the increase in the traffic on the communication network N is further suppressed. Moreover, even in the case that the plurality of image processing apparatuses 1 having different functions are connected to the judgment apparatus 2, the judgment apparatus 2 can properly judge the possibility of image processing depending on the functions of the respective image processing apparatuses 1.

In this embodiment, a configuration is described in the setting item list is transmitted to the judgment apparatus 2 in the case that the image processing apparatuses 1 is started or in the case that an instruction for making a judgment valid is received. However, a configuration in which the judgment apparatus 2 requests the setting item list may also be used. For example, the image processing apparatuses 1 transmits a judgment validity notice to the judgment apparatus 2, the judgment apparatus 2 transmits a request for the setting item list to the image processing apparatuses 1 in response to the reception of the judgment validity notice, and the image processing apparatuses 1 transmits the setting item list in response to the request. Furthermore, also in this embodiment, as in the case of Embodiment 2, a configuration in which the judgment apparatus 2 judges the possibility of image processing in the respective image processing apparatuses 1 on the basis of individual conditions may also be used.

(Embodiment 4)

Figure 16:
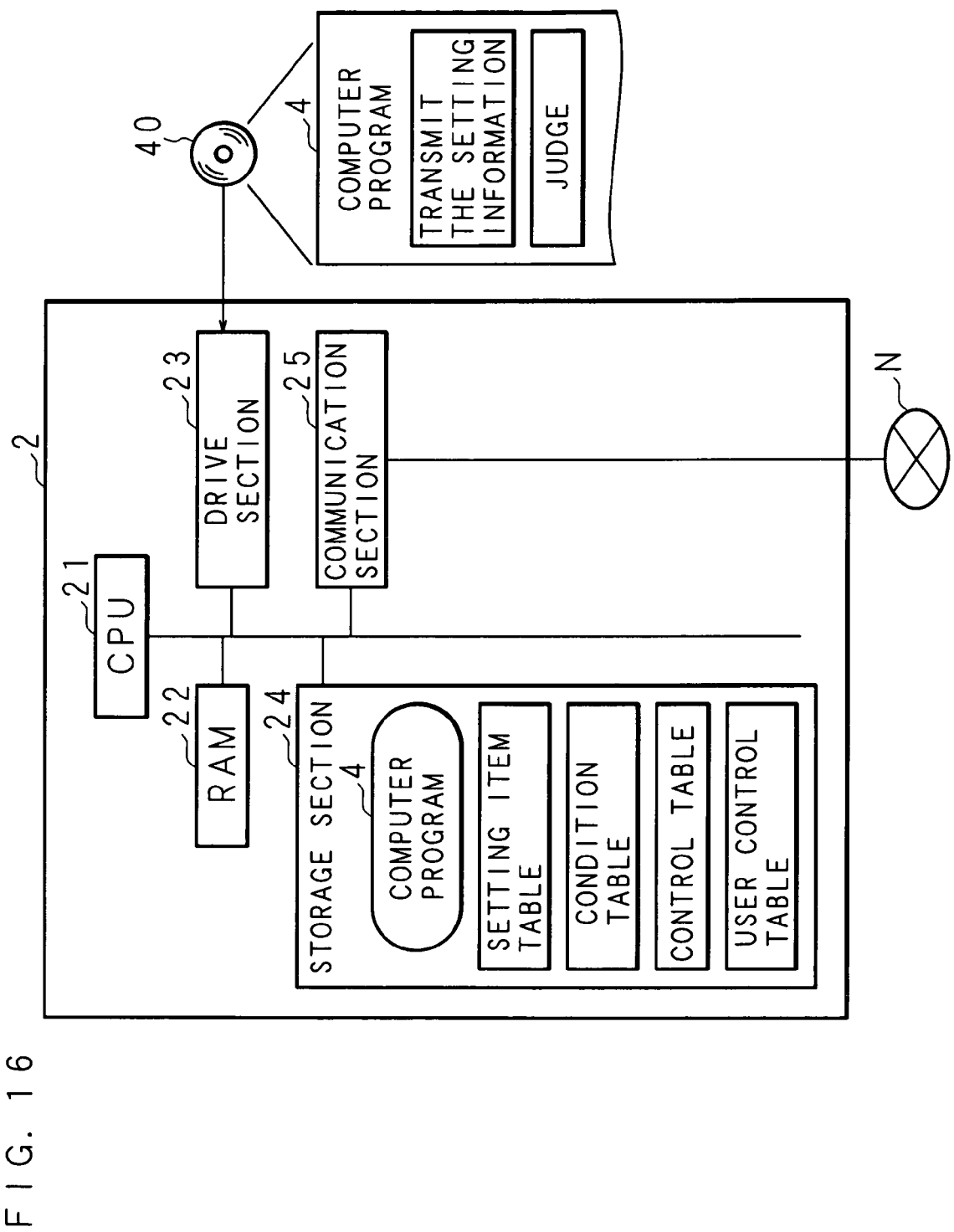
FIG. 16 is a block diagram showing an internal configuration of a judgment apparatus according to Embodiment 4 of the present invention.

In Embodiment 4, a configuration is described in which the judgment apparatus 2 judges the possibility of image processing for a plurality of users on the basis of individual conditions. The overall configuration of the image processing system and the internal configuration of the image processing apparatus 1 are similar to those according to Embodiment 1, and their descriptions are omitted. FIG. 16 is a block diagram showing an internal configuration of the judgment apparatus 2 according to Embodiment 4 of the present invention. The storage section 24 stores a user control table indicating the relationship between each of the plurality of users and a condition for judging the possibility of image processing. Since the other configurations and operations inside the judgment apparatus 2 are similar to those according to Embodiment 1, the corresponding portions are designated by the same numerals, and their descriptions are omitted.

FIG. 17 is a conceptual view showing a content example of the user control table. A login name and a password are recorded as user identification information for identifying a user, and a rule ID for identifying a condition for judging the possibility of image processing is recorded so as to be related to the login name and the password. The condition table according to Embodiment 4 is similar to the condition table according to Embodiment 2 exemplified in FIG. 10. Conditions for judging the possibility of image processing are recorded so as to be related to each of the plurality of rule IDs. The judgment apparatus 2 extracts a rule ID related to the corresponding login name and password in the user control table and judges the possibility of image processing on the basis of the condition related to the rule ID in the condition table. Although an example in which a login name and a password are used as the user identification information is shown in FIG. 17, the judgment apparatus 2 may be configured so as to use other information as user identification information. For example, the judgment apparatus 2 may be configured so that biological information, such as fingerprint, is used as the user identification information.

Figure 18:
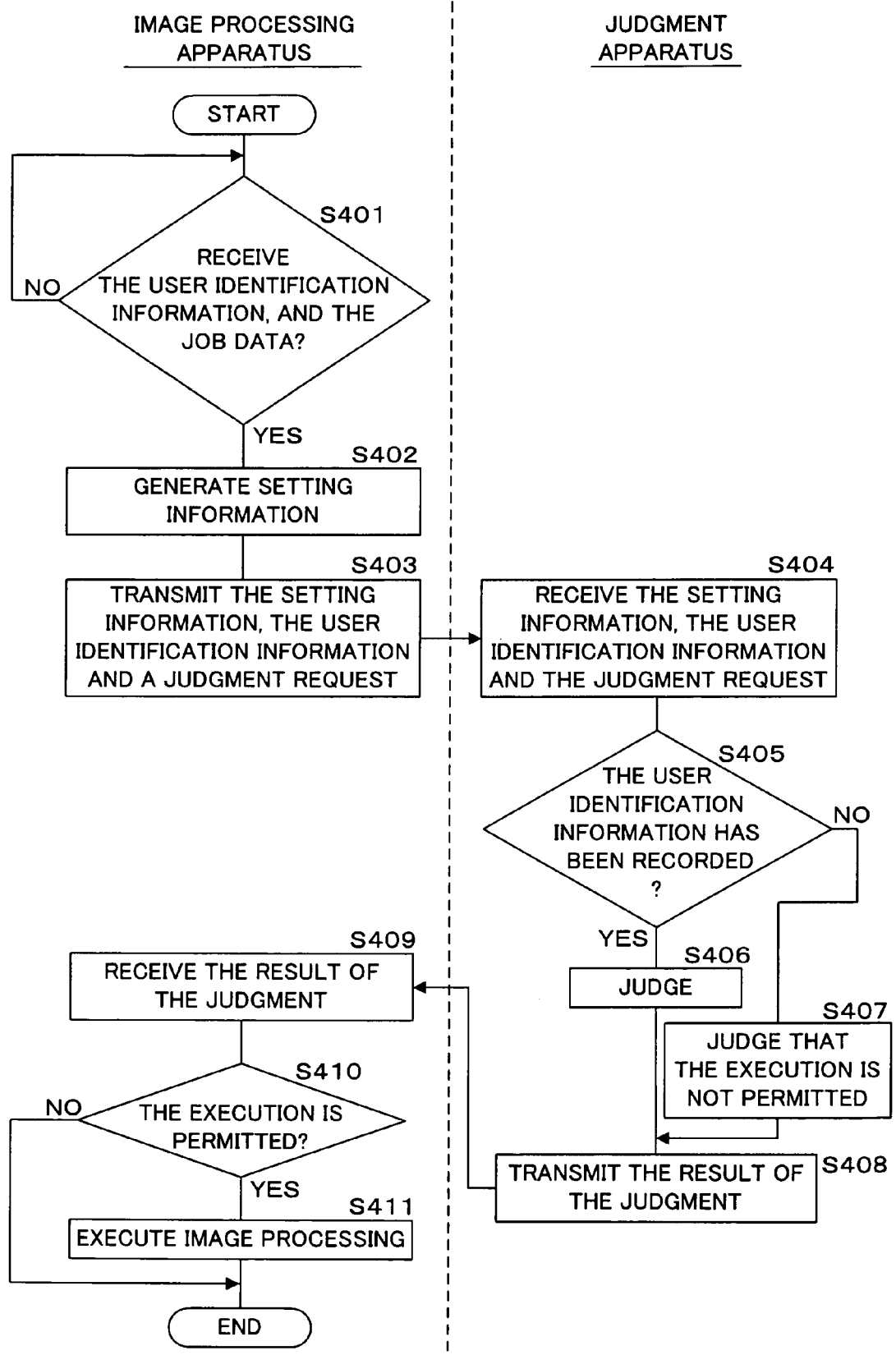
FIG. 18 is a flowchart showing the procedure of judgment processing executed by an image processing system according to Embodiment 4.

Also in Embodiment 4, the image processing system executes the procedure of setting item specifying processing similar to that according to Embodiment 1 shown in the flowchart of FIG. 4. FIG. 18 is a flowchart showing the procedure of judgment processing executed by the image processing system according to Embodiment 4. The CPU 21 of the judgment apparatus 2 executes the following processing according to the computer program 4 loaded into the RAM 22. The transmission apparatus 3 transmits user identification information containing a login name and a password received from a user together with job data to the image processing apparatuses 1. The control section 11 of the image processing apparatuses 1 waits for the reception of the user identification information and the job data transmitted as necessary from the transmission apparatus 3 at the communication section 17 (at S401).

At step S401, in the case that the user identification information and the job data are not received (NO at S401), the control section 11 keeps waiting for the reception. In the case that the user identification information and the job data are received at the communication section 17 (YES at step S401), the control section 11 generates setting information from the received job data (at S402) and causes the communication section 17 to transmit the setting information, the user identification information and a judgment request to the judgment apparatus 2 (at S403).

The judgment apparatus 2 receives the setting information, the user identification information and the judgment request at the communication section 25 (at S404). Next, the CPU 21 judges whether the user identification information conforming to the received user identification information has been recorded in the user control table stored in the storage section 24 (at S405). In the case that the user identification information conforming to the received user identification information has been recorded in the user control table (YES at step 405), the CPU 21 judges the possibility of image processing in the image processing apparatuses 1 (at S406). More specifically, the CPU 21 compares the condition related, according to the condition table, to the rule ID related to the user identification information with the setting indicated by the received setting information and judges whether the setting satisfies the condition, thereby judging the possibility of image processing. In the case that the user identification information conforming to the received user identification information has not been recorded in the user control table at step S405 (NO at S405), the CPU 21 judges that the execution of image processing in the image processing apparatuses 1 is not permitted (at S407). After the completion of step S406 or step 407, the CPU 21 causes the communication section 25 to transmit the result of the judgment to the image processing apparatuses 1 (at S408).

The image processing apparatuses 1 receives the result of the judgment at the communication section 17 (at S409), and the control section 11 judges whether the result of the judgment permits the execution of image processing (at S410). In the case that the result of the judgment permits the execution of image processing (YES at S410), the control section 11 causes the image forming section 15 to execute image processing according to the received job data (at S411). After the image processing, the image processing apparatus 1 completes the procedure of the judgment processing. In the case that the result of the judgment does not permit the execution of image processing at S410 (NO at S410), the control section 11 completes the procedure of the processing without executing image processing according to the job data. After the procedure is completed, the control section 11 starts the procedure from step S401.

As described above, in this embodiment, the judgment apparatus 2 stores the condition for judging the possibility of image processing for each of the plurality of users and judges the possibility of image processing in each image processing apparatus 1 on the basis of the condition of each user. For this reason, the judgment apparatus 2 can restrict the number of functions to be used by the image processing apparatus 1 for each user when each user uses the image processing apparatus 1.

Also in this embodiment, as in the case of Embodiment 2, the judgment apparatus 2 may be configured so as to judge the possibility of image processing in each image processing apparatus 1 on the basis of the individual condition corresponding to the image processing apparatus 1. Furthermore, also in this embodiment, as in the case of Embodiment 3, the image processing apparatus 1 may be configured so as to inform setting items capable of being set at the time of image processing to the judgment apparatus 2.

(Embodiment 5)

Figure 19:
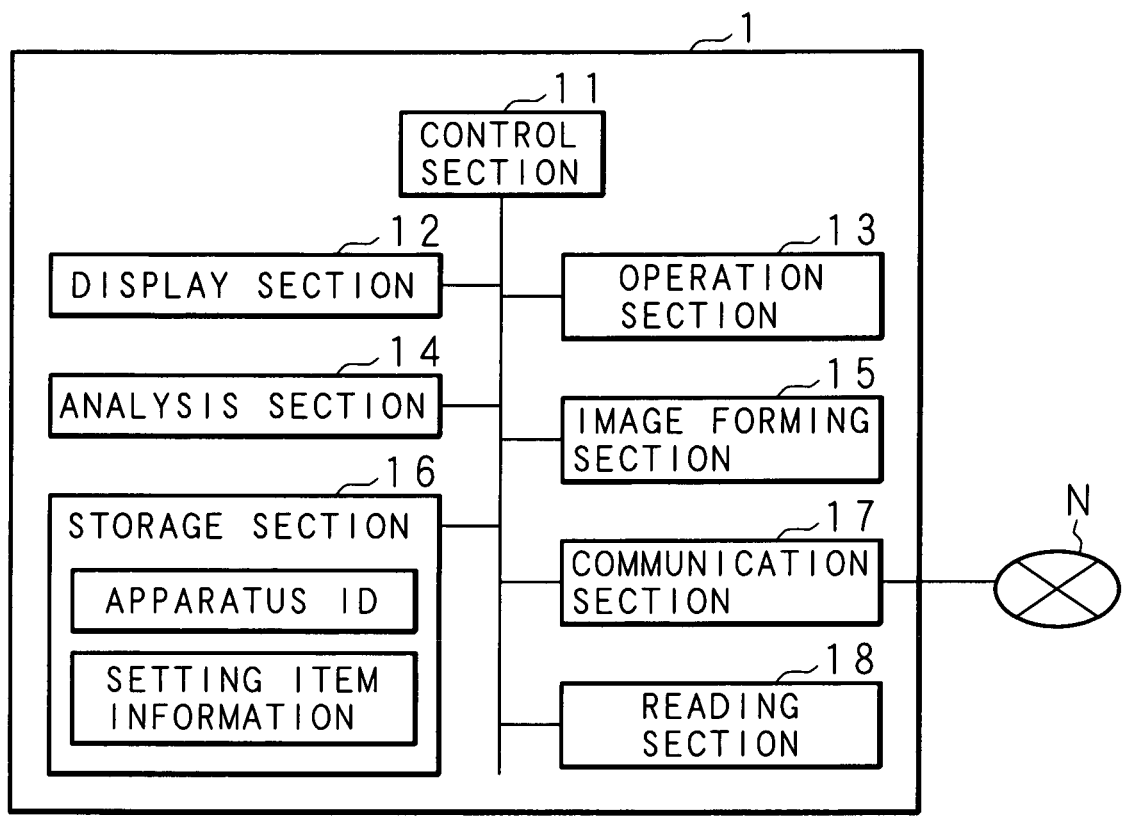
FIG. 19 is a block diagram showing the internal configuration of an image processing apparatus according to Embodiment 5 of the present invention.

In Embodiment 5, a configuration is described in which the image processing apparatus 1 executes plural types of image processing. The overall configuration of the image processing system is similar to that according to Embodiment 1. FIG. 19 is a block diagram showing the internal configuration of the image processing apparatus 1 according to Embodiment 5 of the present invention. The image processing apparatus 1 is equipped with a reading section 18 that optically reads an original image using a scanner and generates image data. Furthermore, an image processing instruction for instructing the execution of image processing for copying the original image and user identification information containing the login name and the password of the user are input through the operation of the operation section 13 by the user. The other configurations and operations of the image processing apparatus 1 are similar to those according to Embodiment 1, the corresponding portions are designated by the same numerals, and their descriptions are omitted.

The image processing apparatus 1 generates image data from the original image at the reading section 18 and forms an image based on the image data at the image forming section 15, thereby executing image processing for copying the original image. In other words, the image processing apparatus 1 can execute plural types of image processing including image processing for forming an image according to the job data received at the communication section 17 and image processing for copying the original image. The image processing apparatus 1 may be configured so as to be equipped with a means for reading data from a recording medium, such as a memory card, and so as to receive the user identification information by reading the user identification information from the recording medium in which the user identification information is stored. Furthermore, the image processing apparatus 1 may be configured so as to be equipped with a means for receiving biological information, such as fingerprint, and so as to receive the biological information of the user as the user identification information.

The internal configuration of the judgment apparatus 2 is similar to that according to Embodiment 4, and the storage section 24 stores a user control table and a condition table similar to those according to Embodiment 4. In other words, the judgment apparatus 2 stores each of a plurality of users and the same condition common in plural types of image processing as a condition for judging the possibility of image processing so as to be related to the user identification information of each user.

Figure 20:
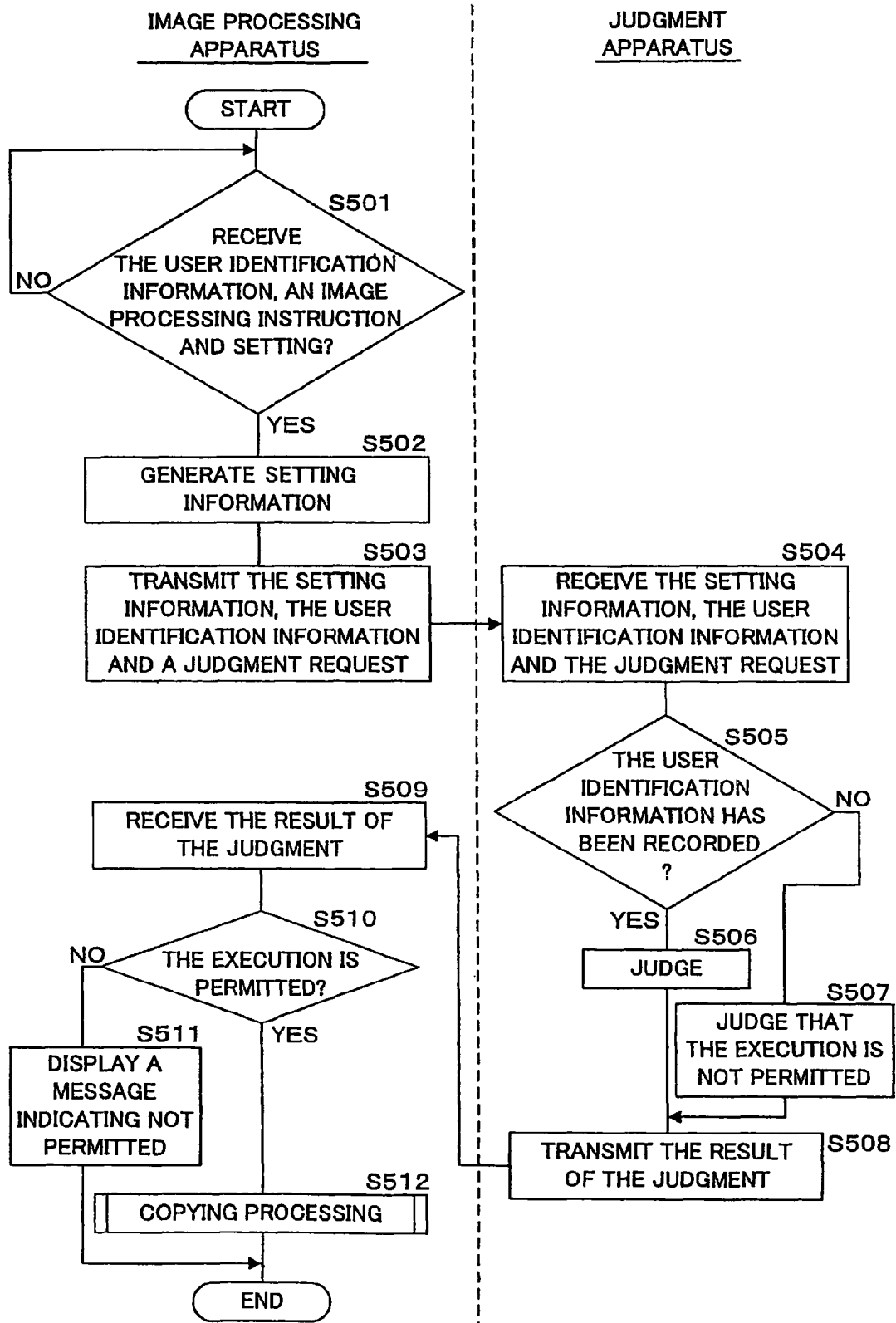
FIG. 20 is a flowchart showing the procedure of judgment processing executed by an image processing system according to Embodiment 5 in the case that the image processing apparatus executes image processing for copying an original image.

Next, the procedure of the processing executed by the image processing system according to this embodiment will be described below. Also in this embodiment, the image processing system executes setting item specifying processing similar to that according to Embodiment 1 and shown in FIG. 4. In the case that the image processing apparatus 1 executes image processing for forming images according to job data, the image processing system executes judgment processing similar to that according to Embodiment 4 and shown in FIG. 18. FIG. 20 is a flowchart showing the procedure of the judgment processing executed by the image processing system according to Embodiment 5 in the case that the image processing apparatus 1 executes image processing for copying an original image. The CPU 21 of the judgment apparatus 2 executes the following processing according to the computer program 4 loaded into the RAM 22. The control section 11 of the image processing apparatus 1 waits for the reception of the user identification information, an image processing instruction for instructing the execution of image processing for copying an original image and settings for copying through the operation of the operation section 13 by the user (at S501). At this time, through the operation of the operation section 13, the user inputs the image processing instruction and the user identification information containing the login name and the password of the user and also inputs settings for copying, such as the color of a copied image, a paper size and page allocation. The image processing apparatus 1 may read the user identification information from the recording medium as described above.

In the case that the user identification information, the image processing instruction for copying and the settings are not received at S501 (NO at S501), the control section 11 keeps waiting for the reception. In the case that the user identification information, the image processing instruction for copying and the settings are received at the operation section 13 (YES at S501), the control section 11 generates setting information indicating the received settings (at S502).

Next, the control section 11 causes the communication section 17 to transmit the setting information, the user identification information and a judgment request to the judgment apparatus 2 (at S503).

The judgment apparatus 2 receives the setting information, the user identification information and the judgment request at the communication section 25 (at S504). The CPU 21 of the judgment apparatus 2 judges whether the user identification information conforming to the received user identification information has been recorded in the user control table stored in the storage section 24 (at S505). In the case that the user identification information conforming to the received user identification information has been recorded in the user control table (YES at S505), the CPU 21 judges the possibility of image processing for copying in the image processing apparatus 1 (at S506). At step S506, the CPU 21 compares the same condition as the condition used for the judgment in the case that the image processing apparatus 1 executes image processing for forming images according to job data with the setting indicated by the received setting information and judges whether the setting satisfies the condition, thereby judging the possibility of image processing for copying. In the case that the user identification information conforming to the received user identification information has not been recorded in the user control table at step S505 (NO at S505), the CPU 21 judges that the execution of image processing for copying in the image processing apparatus 1 is not permitted (at S507). After the completion of step S506 or step S507, the CPU 21 causes the communication section 25 to transmit the result of the judgment to the image processing apparatus 1 (at S508).

The image processing apparatus 1 receives the result of the judgment at the communication section 17 (at S509) and judges whether the result of the judgment permits the execution of image processing for copying (at S510). In the case that the result of the judgment does not permit the execution of image processing for copying (NO at S510), the control section 11 causes the display section 12 to display, to the user, a message indicating that the image processing for copying is not permitted (at S511), and completes the procedure of the processing. At step S510, in the case that the result of the judgment permits the execution of the image processing (YES at S510), the control section 11 executes copying processing (at S512).

Figure 21:
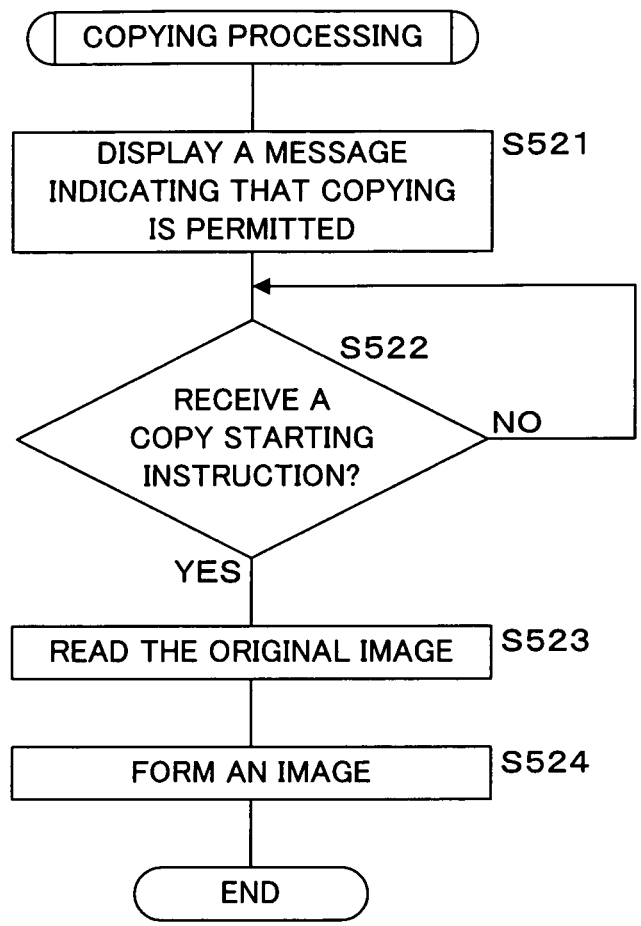
FIG. 21 is a flowchart showing the procedure of the subroutine processing of copying processing at step S512.

FIG. 21 is a flowchart showing the procedure of the subroutine processing of the copying processing at step S512. The control section 11 causes the display section 12 to display a message indicating that the image processing for copying is permitted (at S521). Next, the control section 11 waits for the reception of a copy starting instruction at the operation section 13 through the operation by the user, such as the pressing of a copy starting button provided for the operation section 13 by the user (at S522). In the case that the copy starting instruction is not received (NO at S522), the control section 11 keeps waiting for the reception. In the case that the copy starting instruction is received at the operation section 13, the control section 11 causes the reading section 18 to optically read the original image (at S523). Next, the control section 11 causes the image forming section 15 to form an image on the basis of the image data generated when the original image is read by the reading section 18 (at S524). After the image is formed, the control section 11 completes the subroutine of the copying processing, returns the procedure of the processing to the main routine, and the image processing apparatus 1 completes the procedure of the judgment processing.

As described above, in this embodiment, the image processing apparatus 1 can execute plural types of image processing, and the judgment apparatus 2 judges the possibility of image processing on the basis of a common condition for each user regardless of the difference in the type of image processing. It is thus not necessary to set any condition for judging the possibility of image processing depending on the difference in the respective types of image processing, whereby the operation for setting the condition by an administrator can be simplified.

(Embodiment 6)

Figure 22:
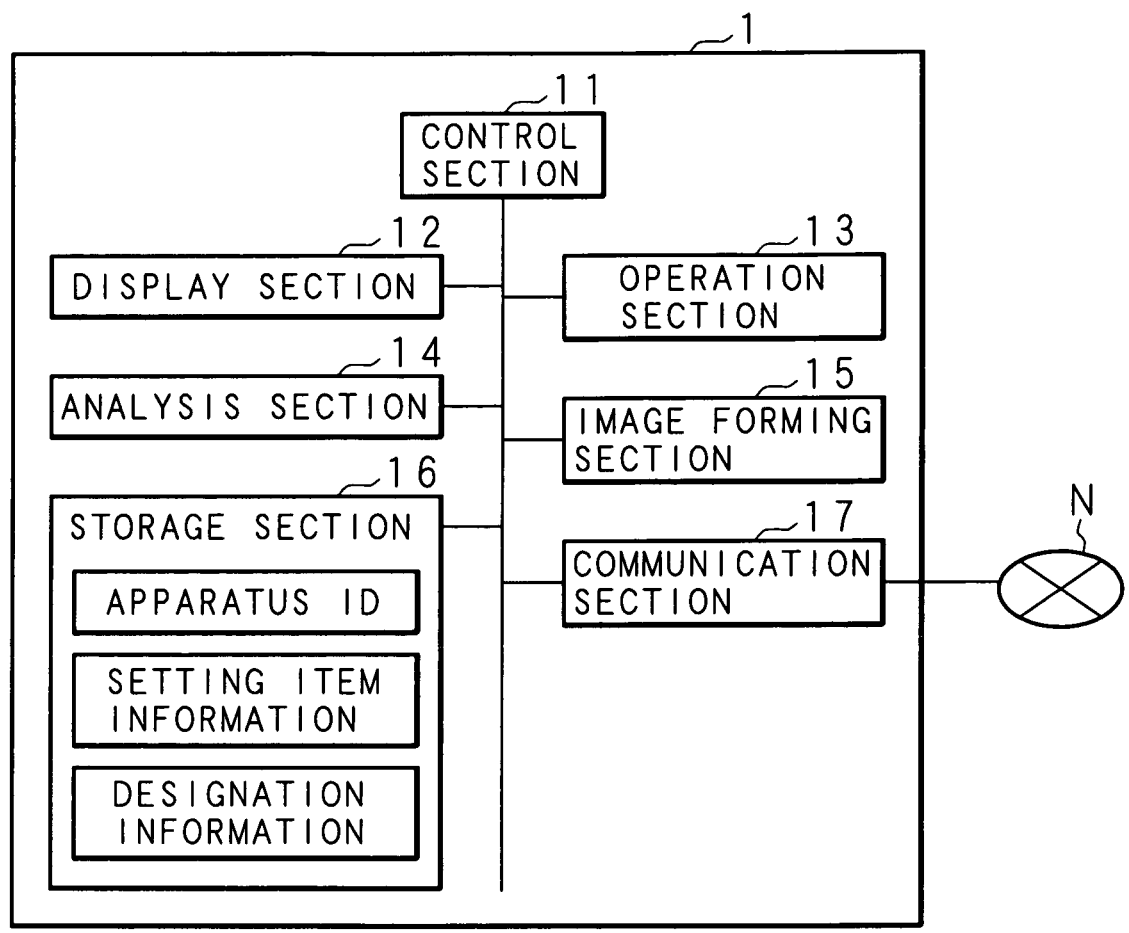
FIG. 22 is a block diagram showing the internal configuration of an image processing apparatus according to Embodiment 6 of the present invention.

In Embodiment 6, a configuration is described in which the judgment apparatus 2 transmits the result of the judgment for the possibility of image processing and other information to the image processing apparatus 1. The overall configuration of the image processing system is similar to that of Embodiment 1. FIG. 22 is a block diagram showing the internal configuration of the image processing apparatus 1 according to Embodiment 6 of the present invention. The storage section 16 of the image processing apparatus 1 stores designation information for designating information to be transmitted to the image processing apparatus 1 by the judgment apparatus 2 together with the result of the judgment. The other configurations and operations of the image processing apparatus 1 are similar to those according to Embodiment 1, the corresponding portions are designated by the same numerals, and their descriptions are omitted.

Figure 23:
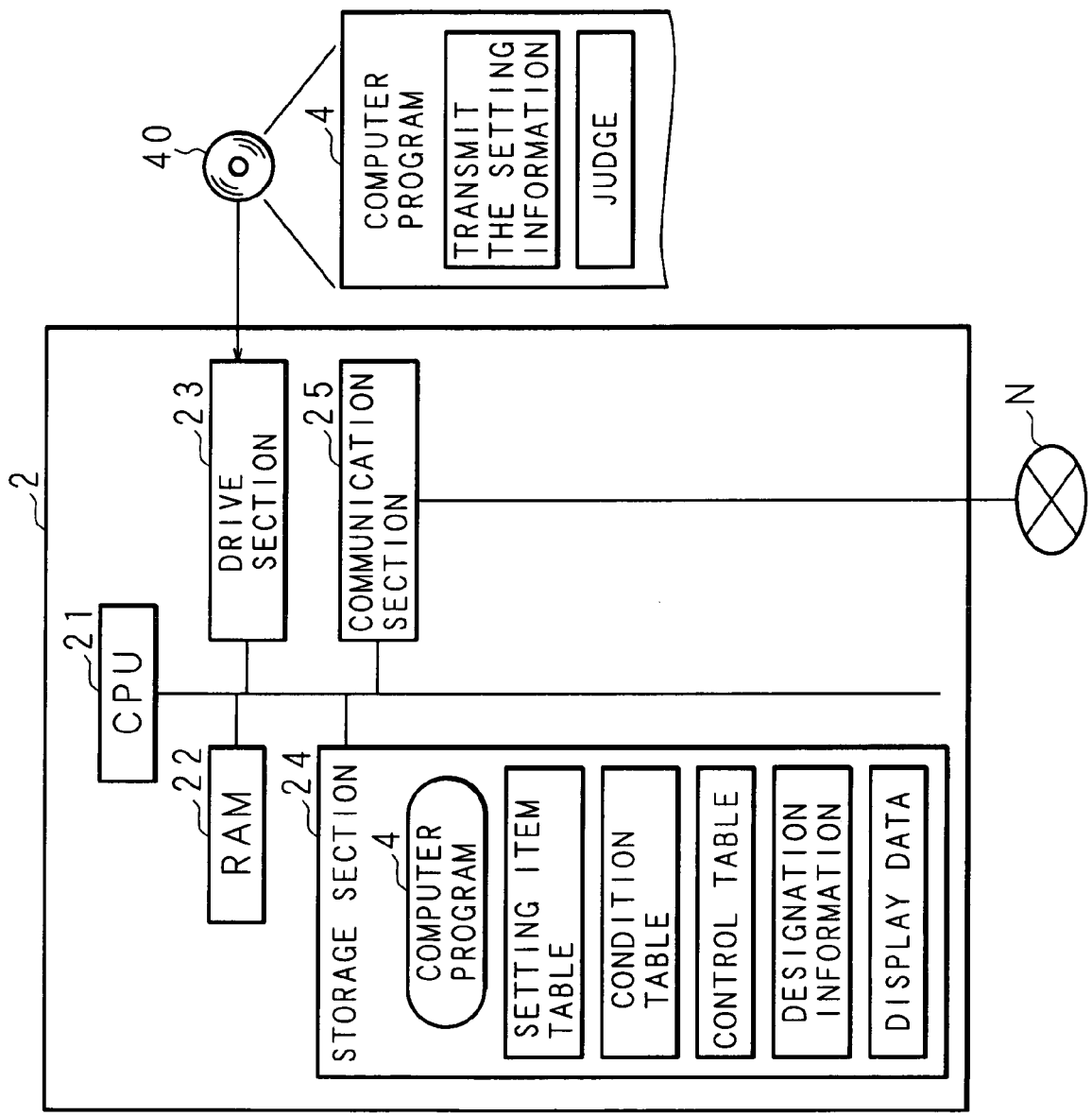
FIG. 23 is a block diagram showing an internal configuration of a judgment apparatus according to Embodiment 6 of the present invention.

FIG. 23 is a block diagram showing an internal configuration of the judgment apparatus 2 according to Embodiment 6 of the present invention. The storage section 24 can store the designation information transmitted from the image processing apparatus 1. In addition, the storage section 24 stores plural pieces of display data for causing the transmission apparatus 3 to display various messages. For example, the storage section 24 stores display data for displaying a message, such as a message indicating that image processing has been permitted or a message indicating the cause of not permitting image processing in the case that image processing is not permitted. The designation information designates a piece of display data selected from the plural pieces of display data stored in the storage section 24. Since the other configurations and operations inside the judgment apparatus 2 are similar to those according to Embodiment 1, the corresponding portions are designated by the same numerals, and their descriptions are omitted.

Next, the processing of the image processing system according to this embodiment will be described. Also in this embodiment, the image processing system executes setting item specifying processing similar to that according to Embodiment 1 shown in the flowchart of FIG. 4. However, the image processing apparatus 1 transmits the designation information stored in the storage section 16 to the judgment apparatus 2 together with the apparatus ID and the judgment validity notice at step S102 or transmits the designation information to the judgment apparatus 2 together with a response to the setting item information at step S108. For example, in the case that image processing is not permitted, the image processing apparatus 1 transmits the designation information for designating display data for displaying a message indicating the cause of not permitting image processing. The judgment apparatus 2 receives the designation information transmitted from the image processing apparatus 1 and stores the information in the storage section 24. Instead of storing the designation information beforehand, the image processing apparatus 1 may be configured so as to receive the designation information at the communication section 17 or so that the designation information is input from the operation section 13 through the operation by the user.

Figure 24:
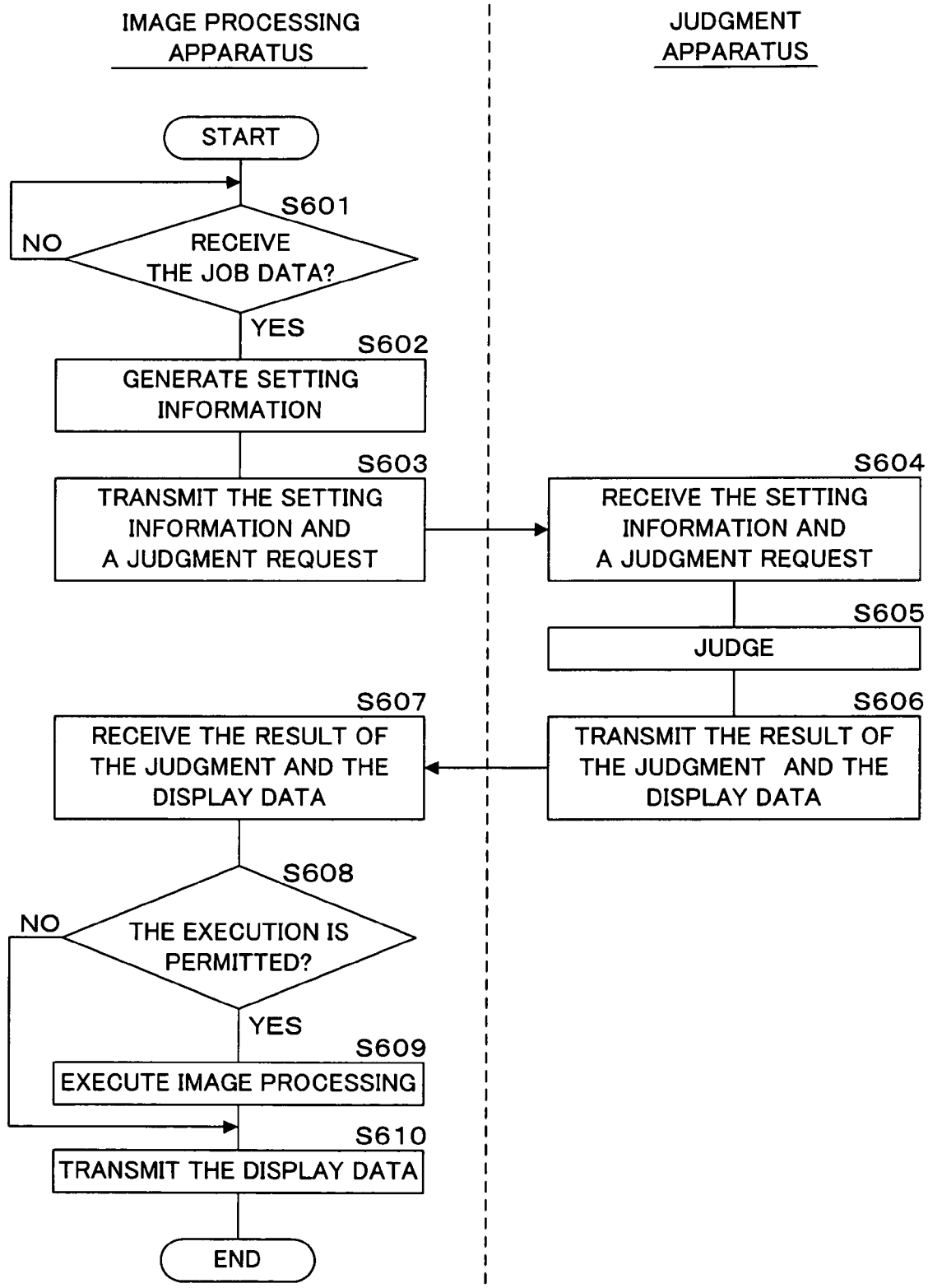
FIG. 24 is a flowchart showing the procedure of judgment processing to be executed by an image processing system according to Embodiment 6.

FIG. 24 is a flowchart showing the procedure of the judgment processing to be executed by the image processing system according to Embodiment 6. The CPU 21 of the judgment apparatus 2 executes the following processing according to the computer program 4 loaded into the RAM 22. The control section 11 of the image processing apparatus 1 waits for the reception of the job data transmitted as necessary from the transmission apparatus 3 at the communication section 17 (at S601). In the case that the job data is not received (NO at S601), the control section 11 keeps waiting for the reception of the job data. In the case that the job data is received at the communication section 17 (YES at S601), the control section 11 generates setting information from the received job data (at S602) and causes the communication section 17 to transmit the setting information and a judgment request to the judgment apparatus 2 (at S603).

The judgment apparatus 2 receives the setting information and the judgment request at the communication section 25 (at S604), and the CPU 21 judges the possibility of image processing in the image processing apparatus 1 on the basis of the received setting information (at S605). Next, the CPU 21 reads the display data designated by the designation information transmitted from the image processing apparatus 1 and stored in the storage section 24 and causes the communication section 25 to transmit the result of the judgment and the read display data to the image processing apparatus 1 (at S606). Instead of selecting the data designated by the designation information from the data stored beforehand, the judgment apparatus 2 may be configured so as to dynamically generate the data designated by the designation information and to transmit the data to the image processing apparatus 1.

The image processing apparatus 1 receives the result of the judgment and the display data at the communication section 17 (at S607), and the control section 11 judges whether the execution of image processing is permitted by the result of the judgment (at S608). In the case that the execution of image processing is permitted by the result of the judgment (YES at S608), the control section 11 causes the image forming section 15 to execute image processing corresponding to the received job data (at step S609). At step S608, in the case that the execution of image processing is not permitted by the result of the judgment (NO at S608), the control section 11 does not execute image processing. After the completion of step S609 or in the case that the execution of image processing is not permitted by the result of the judgment at step S608, the control section 11 causes the communication section 17 to transmit the received display data to the transmission apparatus 3 serving as the transmission source of the job data (at S610). The transmission apparatus 3 displays a message on the basis of the display data transmitted from the image processing apparatus 1. The image processing apparatus 1 thus completes the procedure of the judgment processing.

In the case that the designation information designates the display data for displaying the message indicating the cause of not permitting the execution of image processing when the execution of image processing is not permitted, the transmission apparatus 3 displays the message indicating the cause of not permitting the execution of image processing when the execution of image processing is not permitted. For example, a message informing that the execution of image processing is not permitted because color printing is prohibited is displayed. Furthermore, in the case that the designation information designates display data for displaying a message for prompting a user to change the cause of not permitting the execution of image processing and to re-input the image processing instruction, when the execution of image processing is not permitted, the transmission apparatus 3 displays the message for prompting a user to change the cause of not permitting the execution of image processing and to re-input the image processing instruction. For example, a message for prompting a user to change color printing to monochrome printing and to re-input of the image processing instruction is displayed. The judgment apparatus 2 may transmit display data for causing the display section 12 of the image processing apparatus 1 to display a message, instead of the display data for causing the transmission apparatus 3 to display a message. In this case, the image processing apparatus 1 executes the processing for displaying a message based on the display data on the display section 12 at step S610. Furthermore, the information designated by the designation information is not restricted to the display data, and the designation information may contain other information, such as image data for causing the image forming section 15 of the image processing apparatus 1 to form an image in which the result of the judgment is recorded. Even in this case, the image processing apparatus 1 executes processing on the basis of the information transmitted from the judgment apparatus 2 together with the result of the judgment at step S610.

As described above, in this embodiment, the judgment apparatus 2 transmits pre-designated information together with the result of the judgment for the possibility of image processing to the image processing apparatus 1, and the image processing apparatus 1 executes information processing using the transmitted information. The information to be transmitted from the judgment apparatus 2 is designated beforehand by transmitting the designation information from the image processing apparatus 1 to the judgment apparatus 2 beforehand. With this processing, it is possible to realize an image processing system, circumstances of which are easy to understand by the user and which is easy to use by the user, for example, when the execution of image processing is not permitted, the cause of not permitting the execution is clarified.

Also in this embodiment, as in the case of Embodiment 2, the judgment apparatus 2 may be configured so as to judge the possibility of image processing at each image processing apparatus 1 on the basis of the individual condition corresponding to the image processing apparatus 1. Furthermore, also in this embodiment, as in the case of Embodiment 3, the image processing apparatus 1 may be configured so as to inform setting items capable of being set at the time of image processing to the judgment apparatus 2. Moreover, also in this embodiment, as in the cases of Embodiments 4 and 5, the judgment apparatus 2 may be configured so as to judge the possibility of image processing in the image processing apparatus 1 on the basis of the condition of each user. Still further, also in this embodiment, as in the cases of Embodiment 5, the image processing apparatus 1 may be configured so as to execute plural types of image processing.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing system, comprising:
    one or more image processing apparatuses; and
    a judgment apparatus for judging the possibility of image processing in the image processing apparatus,
    wherein the judgment apparatus, includes
        a setting item information transmission section for transmitting, to the image processing apparatus, setting item information indicating one or more specific setting items for setting the details of image processing in the image processing apparatus,
    the image processing apparatus, includes:
        an image processing instruction receiving section for receiving an image processing instruction;
        a setting information generating section for generating setting information indicating settings corresponding to setting items indicated by the received setting item information among the settings related to image processing according to the received image processing instruction; and
        a judgment request transmission section for transmitting the generated setting information and a judgment request for requesting a judgment for the possibility of image processing according to the image processing instruction to the judgment apparatus,
    the judgment apparatus, further includes:
        a judgment section for judging the possibility of the image processing requested by the received judgment request on the basis of the received setting information; and
        a judgment result transmission section for transmitting a judgment result at the judgment section to the image processing apparatus, and
    the image processing apparatus, further includes
        an image processing section for executing the image processing in the case that the received judgment result permits the execution of the image processing.

2. The image processing system according to claim 1,
    wherein the judgment apparatus, further includes
        a setting item storage section for storing one or more specific setting items so as to be related to apparatus identification information for identifying the image processing apparatus, and
    wherein the setting item information transmission section transmits setting item information indicating setting items stored so as to be related to the stored apparatus identification information to the image processing apparatus.

3. The image processing system according to claim 1,
    wherein the image processing apparatus, further includes
        a list transmission section for transmitting a list of a plurality of setting items capable of being set at the time of image processing to the judgment apparatus,
    the judgment apparatus, further includes
        a setting item information generating section for generating setting item information indicating one or more specific setting items contained in the received list, and
    wherein the setting item information transmission section transmits the generated setting item information to the image processing apparatus serving as the transmission source of the list.

4. The image processing system according to claim 1,
    wherein the judgment apparatus, further includes
        a condition storage section for storing conditions to be satisfied by settings related to image processing so that the execution of image processing in the image processing apparatus is permitted while the conditions are related to user identification information for identifying a user,
    the image processing apparatus, further includes:
        a user identification information receiving section for receiving user identification information; and a user identification information transmission section for transmitting the received user identification information to the judgment apparatus, and wherein the judgment section judges the possibility of image processing in the image processing apparatus by judging whether the settings indicated by the received setting information satisfy the conditions stored so as to be related to the user identification information received at the judgment apparatus.

5. The image processing system according to claim 4, wherein the image processing section executes plural types of image processing, the image processing apparatus receives an image processing instruction corresponding to each of the plural types of image processing, and wherein the judgment apparatus stores a condition common in the plural types of image processing as a condition to be satisfied by a setting related to image processing so that the execution of image processing in the image processing apparatus is permitted while the condition is related to the user identification information.

6. The image processing system according to claim 1, wherein the image processing apparatus, further includes the designation information transmission section for transmitting, to the judgment apparatus, designation information for designating information to be transmitted to the image processing apparatus by the judgment apparatus together with the judgment result, the judgment apparatus, further includes an information transmission section for transmitting information designated by the designation information to the image processing apparatus when the judgment result at the judgment section is transmitted to the image processing apparatus.

* * * * *